US012746760B2

(12) United States Patent
Nakagawa et al.

(10) Patent No.: US 12,746,760 B2
(45) Date of Patent: Sep. 29, 2026

(54) INKJET PRINTER

(71) Applicant: BROTHER KOGYO KABUSHIKI KAISHA, Nagoya (JP)

(72) Inventors: Shinya Nakagawa, Nagoya (JP); Haruhisa Takayama, Nagoya (JP); Yuya Kato, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 239 days.

(21) Appl. No.: 18/192,126

(22) Filed: Mar. 29, 2023

(65) Prior Publication Data

US 2023/0321973 A1 Oct. 12, 2023

(30) Foreign Application Priority Data

Apr. 1, 2022 (JP) ................................ 2022-061456
Aug. 3, 2022 (JP) ................................ 2022-124124

(51) Int. Cl.
*B41J 2/21* (2006.01)
*B41J 2/045* (2006.01)

(52) U.S. Cl.
CPC ........... *B41J 2/2142* (2013.01); *B41J 2/0451* (2013.01); *B41J 2/0458* (2013.01); *B41J 2/04581* (2013.01)

(58) Field of Classification Search
CPC ...... B41J 2/2142; B41J 2/0451; B41J 2/0458; B41J 2/04581
See application file for complete search history.

(56) References Cited

U.S. PATENT DOCUMENTS 6,224,183 B1 5/2001 Kono et al.
2007/0229573 A1 10/2007 Takeishi et al.
2008/0273203 A1 11/2008 Miyahara
2013/0016153 A1 1/2013 Yamaguchi et al.
2013/0155136 A1 6/2013 Sakurada
2013/0215181 A1* 8/2013 Fujikura .............. B41J 11/0095 347/19
2017/0087862 A1 3/2017 Kuronuma et al.
2020/0307240 A1* 10/2020 Kumamoto ............ B41J 2/1752

FOREIGN PATENT DOCUMENTS

JP 4-276446 A 10/1992
JP 8-309963 A 11/1996
JP 2002079693 A * 3/2002
JP 2006044000 A 2/2006

(Continued)

*Primary Examiner* — Justin Seo
(74) *Attorney, Agent, or Firm* — Merchant & Gould P.C.

(57) ABSTRACT

An inkjet printer is provided that includes: a head including a nozzle, a light emitting element, a beam splitter configured to split an optical path into first and second optical paths, first and second light receiving elements configured to receive light passing through the first and second optical paths, respectively, a subtraction circuit configured to obtain a difference between an amount of received light by the first light receiving element and an amount of received light by the second light receiving element, and a controller. The first optical path is provided so as to pass through a flying area in which ink ejected from the nozzles flies, and the second optical path is provided so as not to pass through the flying area. The controller is configured to execute to judge an ejection state of ink by the head based on the difference.

10 Claims, 11 Drawing Sheets

(56) References Cited

FOREIGN PATENT DOCUMENTS

| | | | | | |
|---|---|---|---|---|---|
| JP | 2006-240119 A | | 9/2006 | | |
| JP | 2007-072057 A | | 3/2007 | | |
| JP | 2007-276888 A | | 10/2007 | | |
| JP | 2008-273087 A | | 11/2008 | | |
| JP | 2013-018267 A | | 1/2013 | | |
| JP | 2013035138 A | * | 2/2013 | .......... | B41J 2/16526 |
| JP | 2013-123826 A | | 6/2013 | | |
| JP | 2013-123911 A | | 6/2013 | | |
| JP | 2013-169688 A | | 9/2013 | | |
| JP | 2013-202827 A | | 10/2013 | | |
| JP | 2017-061126 A | | 3/2017 | | |
| JP | 2020-157634 A | | 10/2020 | | |

* cited by examiner

INKJET PRINTER

REFERENCE TO RELATED APPLICATIONS

This application claims priorities from Japanese Patent Application No. 2022-061456 filed on Apr. 1, 2022 and Japanese Patent Application No. 2022-124124 filed on Aug. 3, 2022. The entire contents of the priority applications are incorporated herein by reference.

BACKGROUND ART

There is known an inkjet printer in which ink droplets are ejected from a nozzle so as to pass through a light beam irradiated from a light emitting element and received by a light receiving element, and an amount of light when the droplet passes through the light beam is measured by the light receiving element. The known inkjet printer judges that the droplet ejection state is normal when a detected amount of received light is less than a first threshold and greater than a second threshold.

DESCRIPTION

In such an inkjet printer, if the size of the droplets is small relative to the size of the light beam, for example, it becomes difficult to distinguish between changes in the amount of received light due to the droplets and changes in the amount of received light due to noise. There is a possibility that the droplet ejection state cannot be accurately judged.

In view of such circumstances, an object of the present disclosure is to provide a technique that contributes to improving the accuracy of judgement of the ink ejection state by a head.

According to an aspect of the present disclosure, there is provided an inkjet printer including: a head, a light emitting element, a beam splitter, a first light receiving element, a second light receiving element, a subtraction circuit and a controller. The head includes a nozzle configured to eject an ink. The light emitting element is configured to emit light. The beam splitter is configured to split an optical path, which is a path of light emitted from the light emitting element, into a first optical path and a second optical path. The first light receiving element is configured to receive light passing through the first optical path. The second light receiving element is configured to receive light passing through the second optical path. The subtraction circuit is configured to obtain a difference between an amount of received light by the first light receiving element and an amount of received light by the second light receiving element. The first optical path is provided so as to pass through a flying area in which the ink ejected from the nozzle flies. The second optical path is provided so as not to pass through the flying area. The controller is configured to execute a judgement of an ejection state of the ink based on the difference.

According to another aspect of the present disclosure, there is provided an inkjet printer including: a head, a light irradiation device, an external light receiving element, a subtraction circuit, and a controller. The head includes a nozzle configured to eject an ink. The light irradiation device includes: the light emitting element configured to emit light in a first direction and a second direction different from the first direction; and an internal light receiving element configured to receive light emitted in the first direction by the light emitting element. The external light receiving element is configured to receive light emitted from the light irradiation device in the second direction by the light emitting element. The subtraction circuit is configured to obtain a difference between a light receiving signal corresponding to an amount of received light by the internal light receiving element and a light receiving signal corresponding to an amount of received light by the external light receiving element. An optical path which is a path of light irradiated from the light irradiation device and received by the external light receiving element, passes through a flying area in which the ink ejected from the nozzle flies. The controller is configured to execute a judgement of an ejection state of ink by the head based on the difference.

Figure 4A:
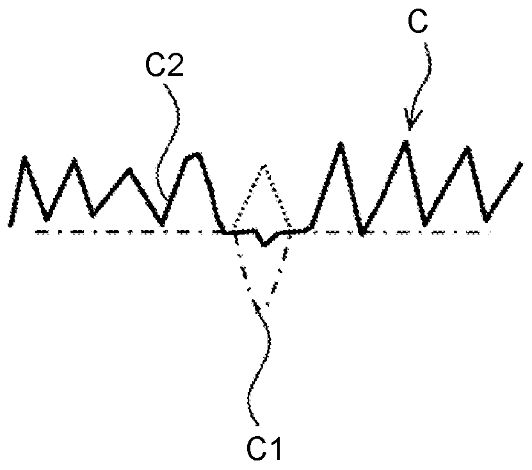
Figure 4B:
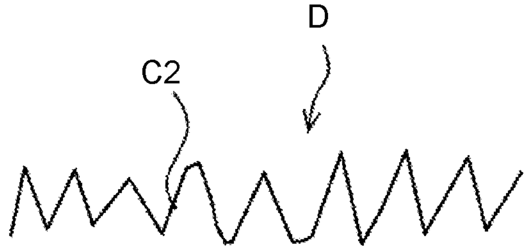
Figure 4C:
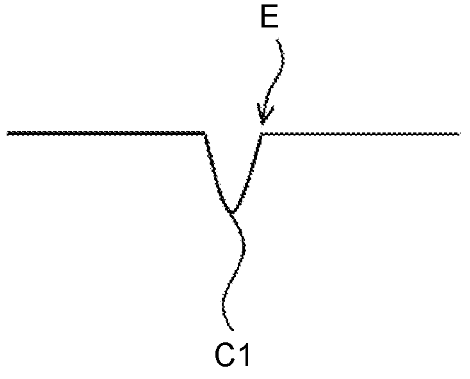

FIG. 4A depicts an electrical signal by a first light receiving element 63. FIG. 4B depicts an electrical signal by a second light receiving element 64. FIG. 4C depicts an electrical signal by a subtraction circuit 65.

Figure 5:
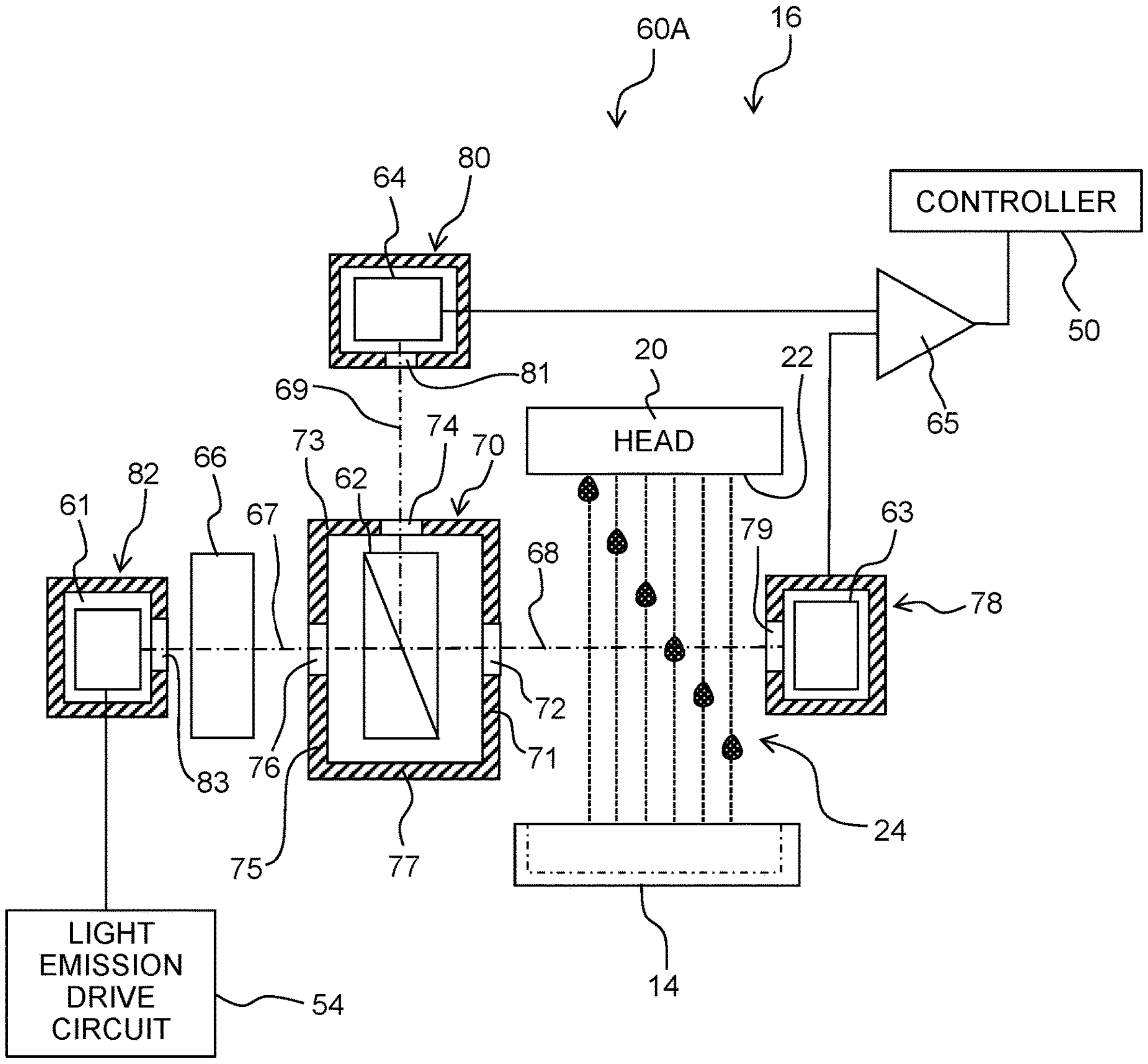

FIG. 5 is a schematic diagram of an inspection section 60A of an inkjet printer 10.

Figure 6:
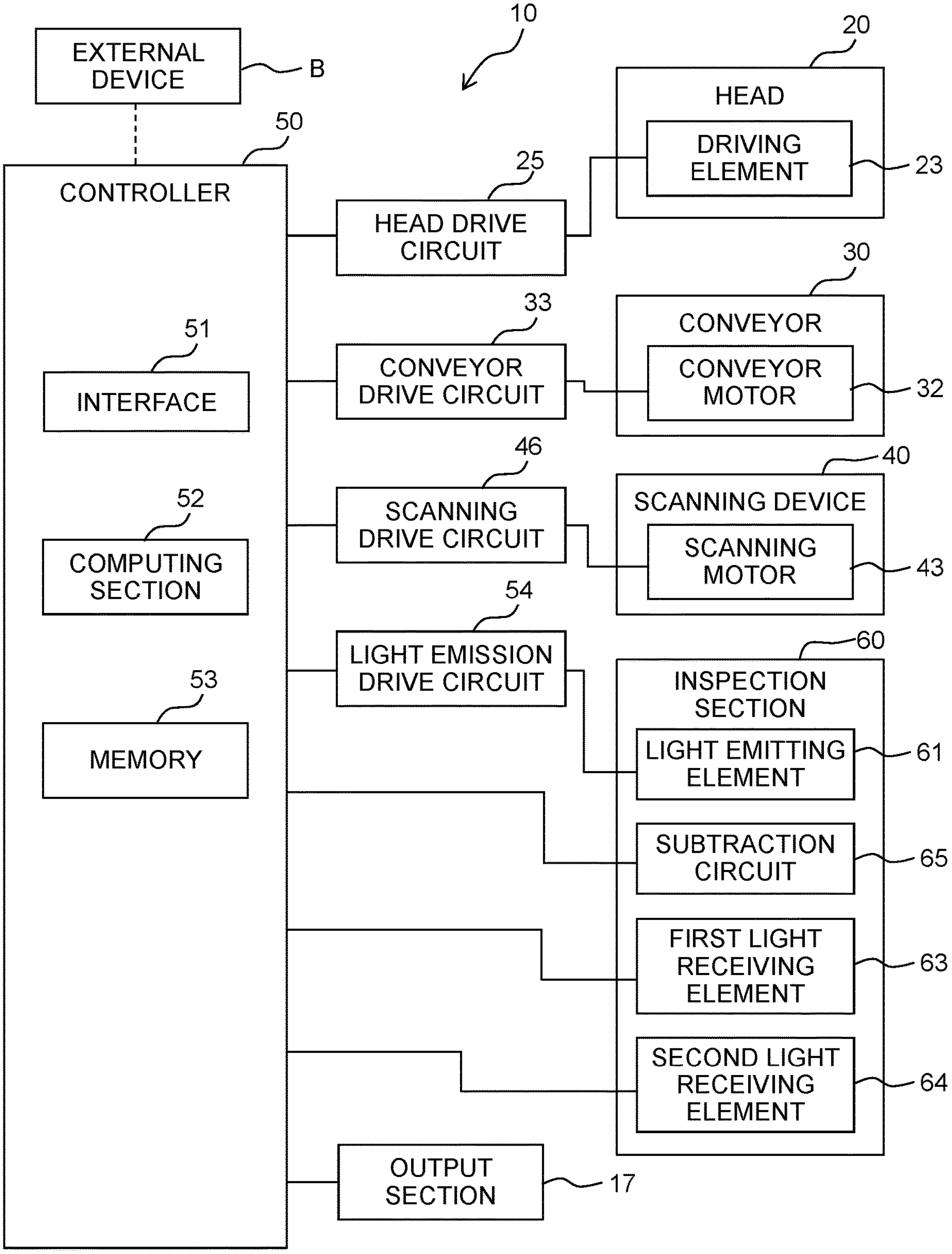

FIG. 6 is a functional block diagram of an inkjet printer 10.

Figure 7:
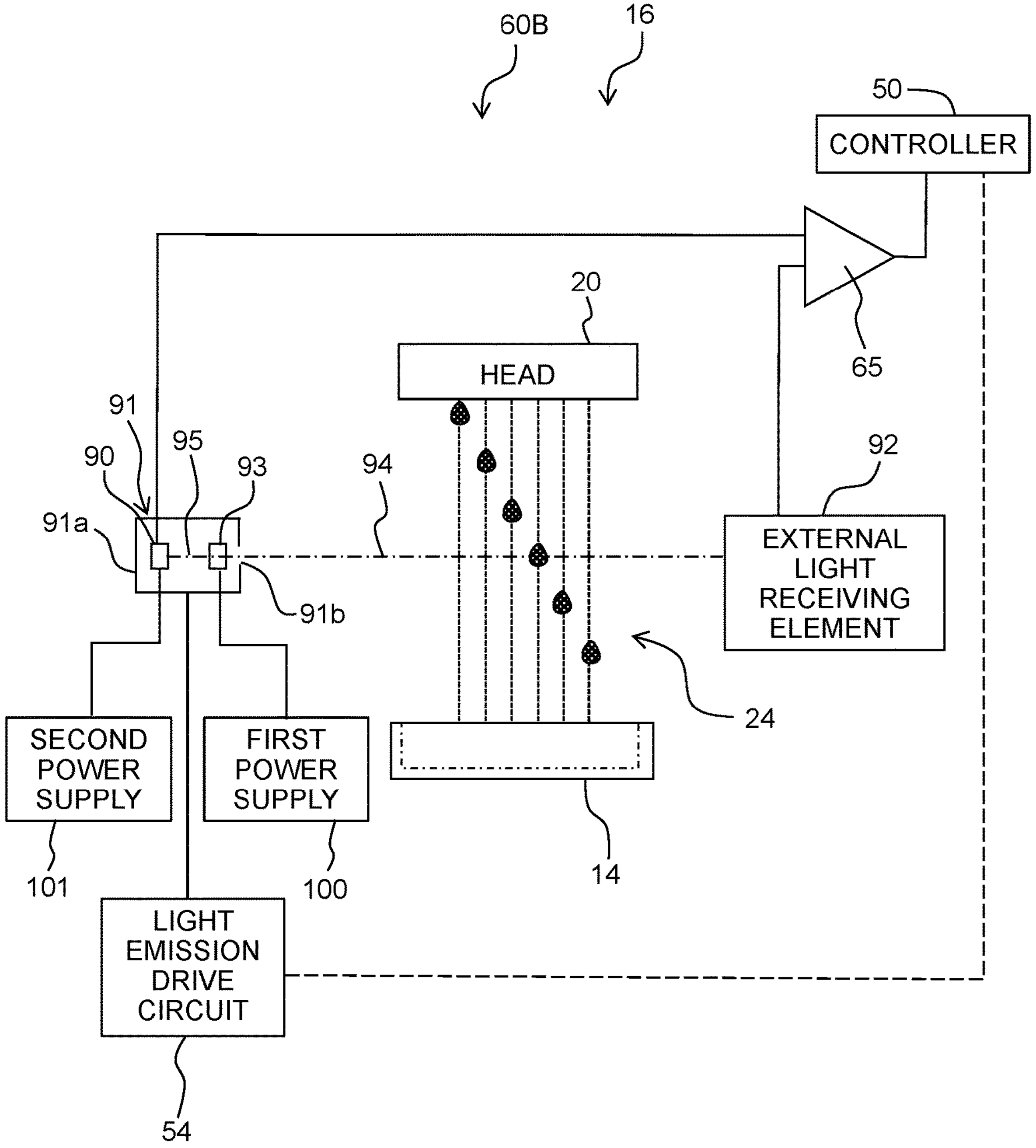

FIG. 7 is a schematic diagram of an inspection section 60B of an inkjet printer 10.

Figure 8:
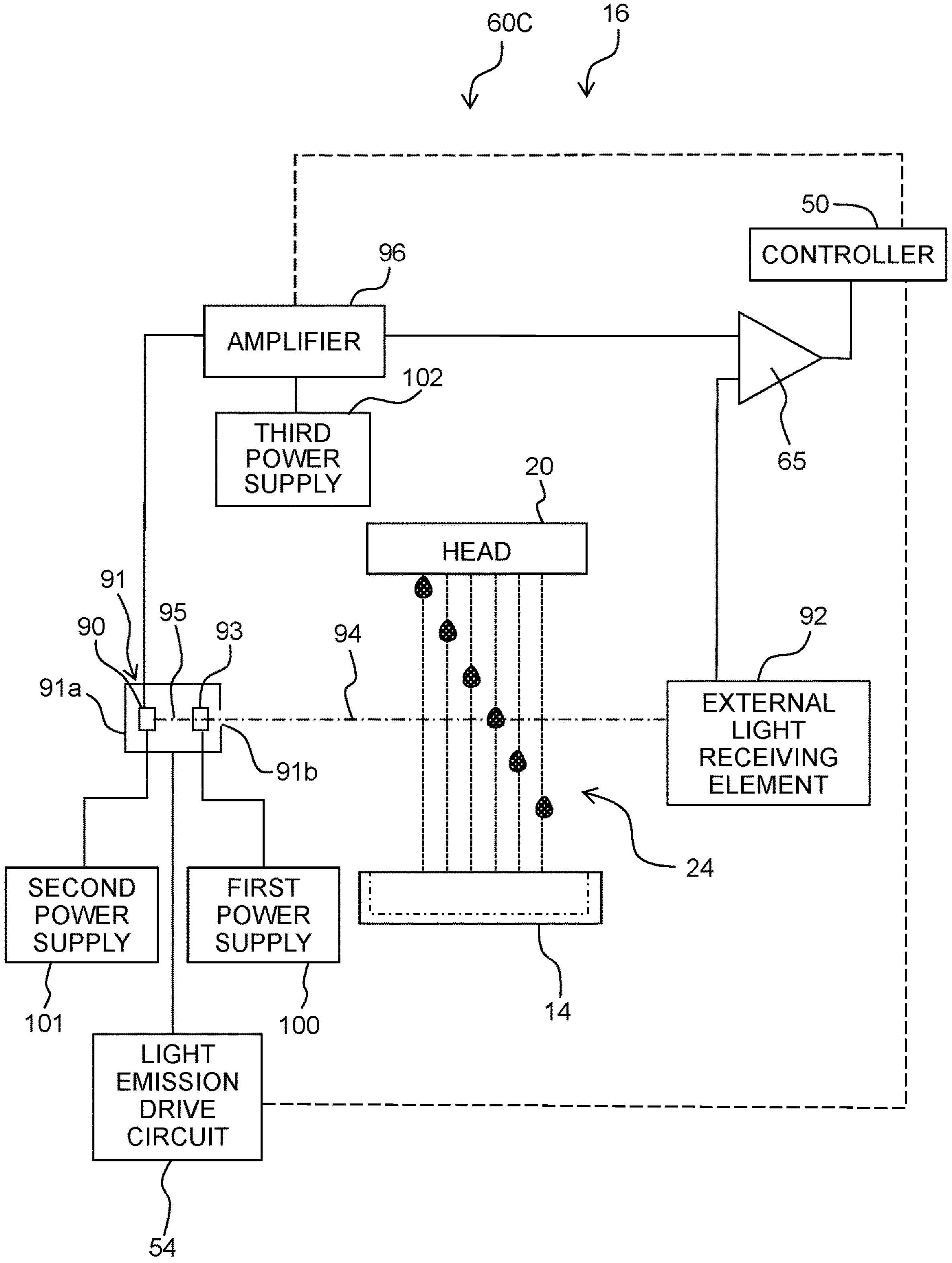

FIG. 8 is a schematic diagram of an inspection section 60C of an inkjet printer 10.

Figure 9:
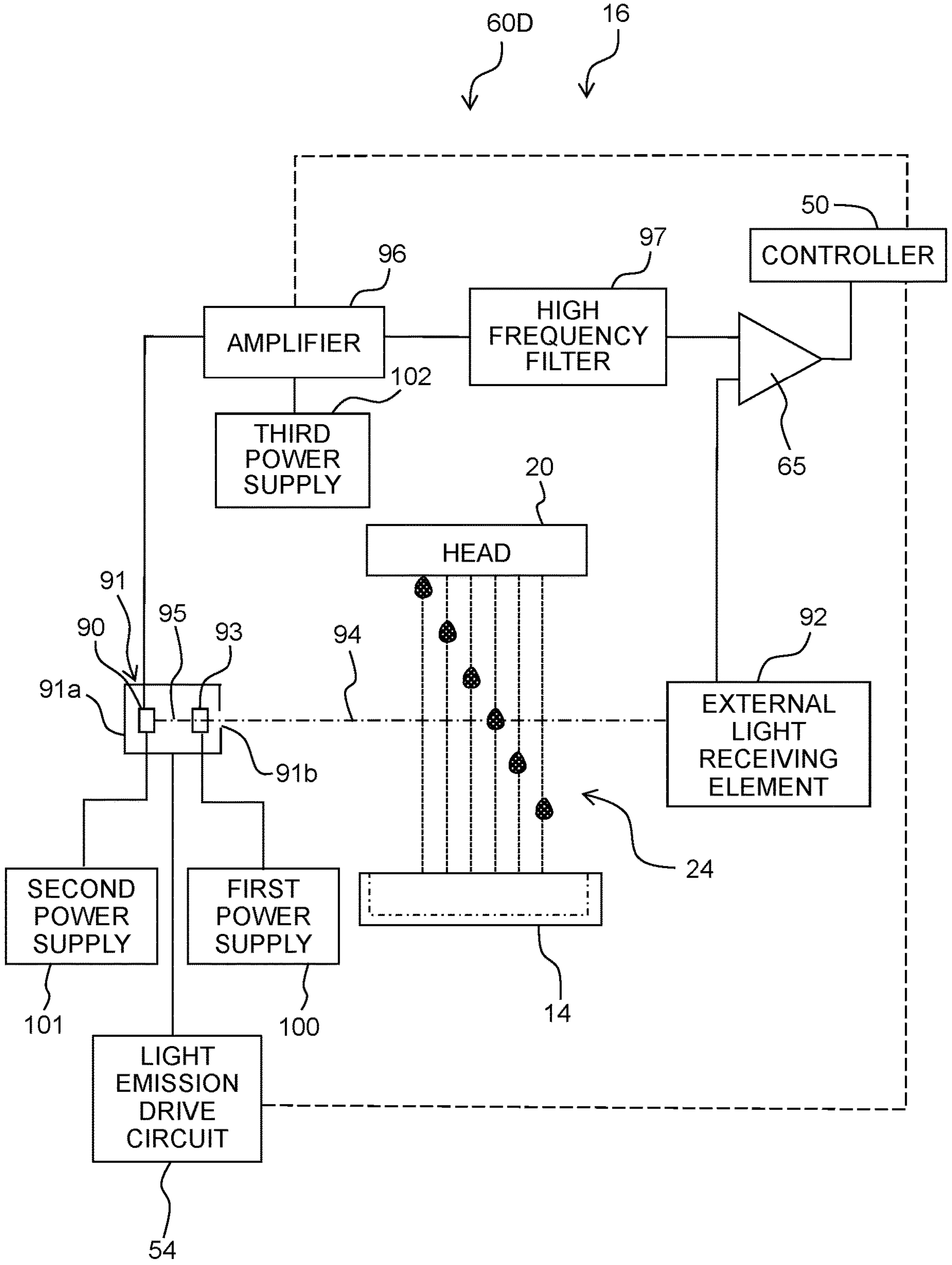

FIG. 9 is a schematic diagram of an inspection section 60D of an inkjet printer 10.

Figure 10:
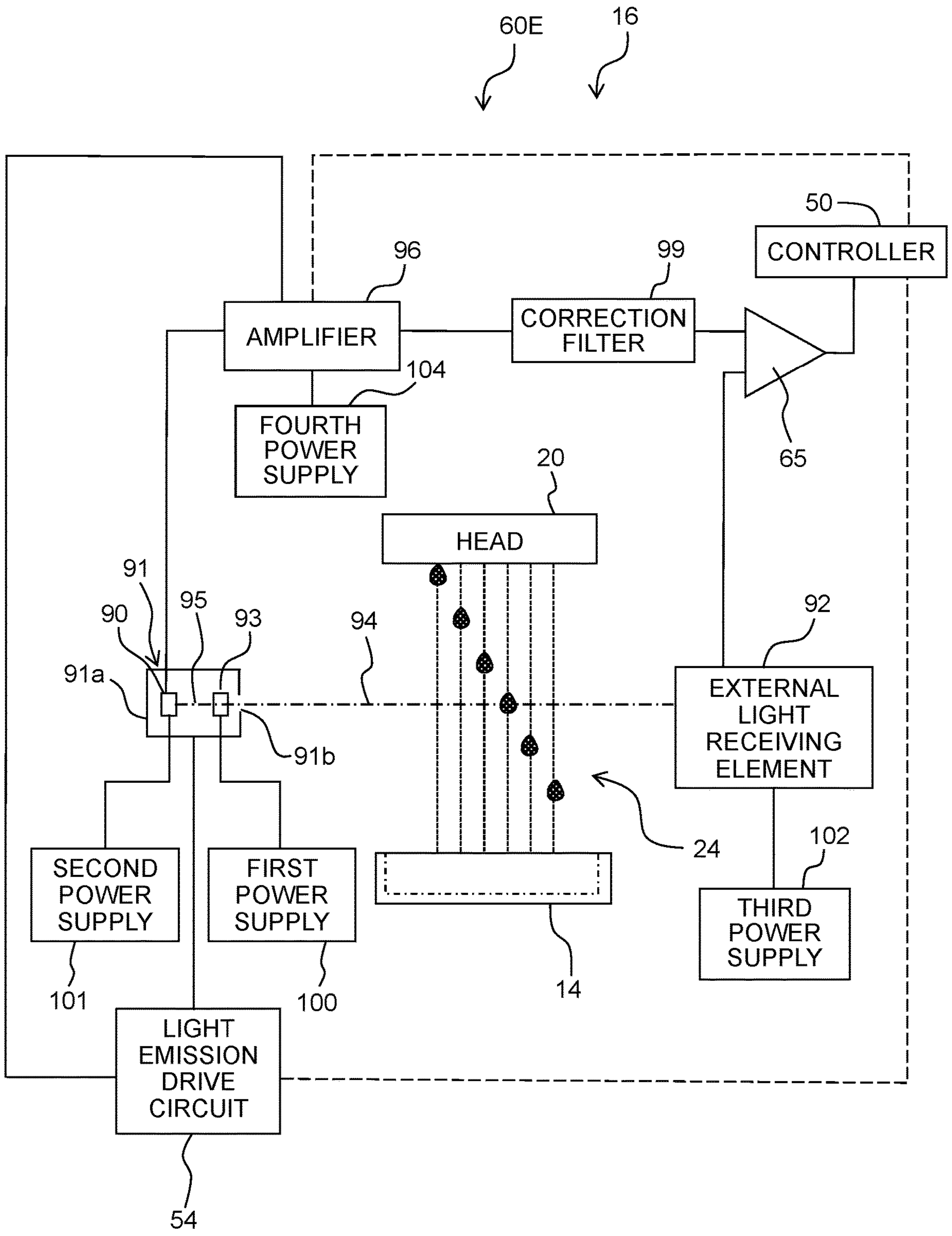

FIG. 10 is a schematic diagram of an inspection section 60E of an inkjet printer 10.

Figure 11:
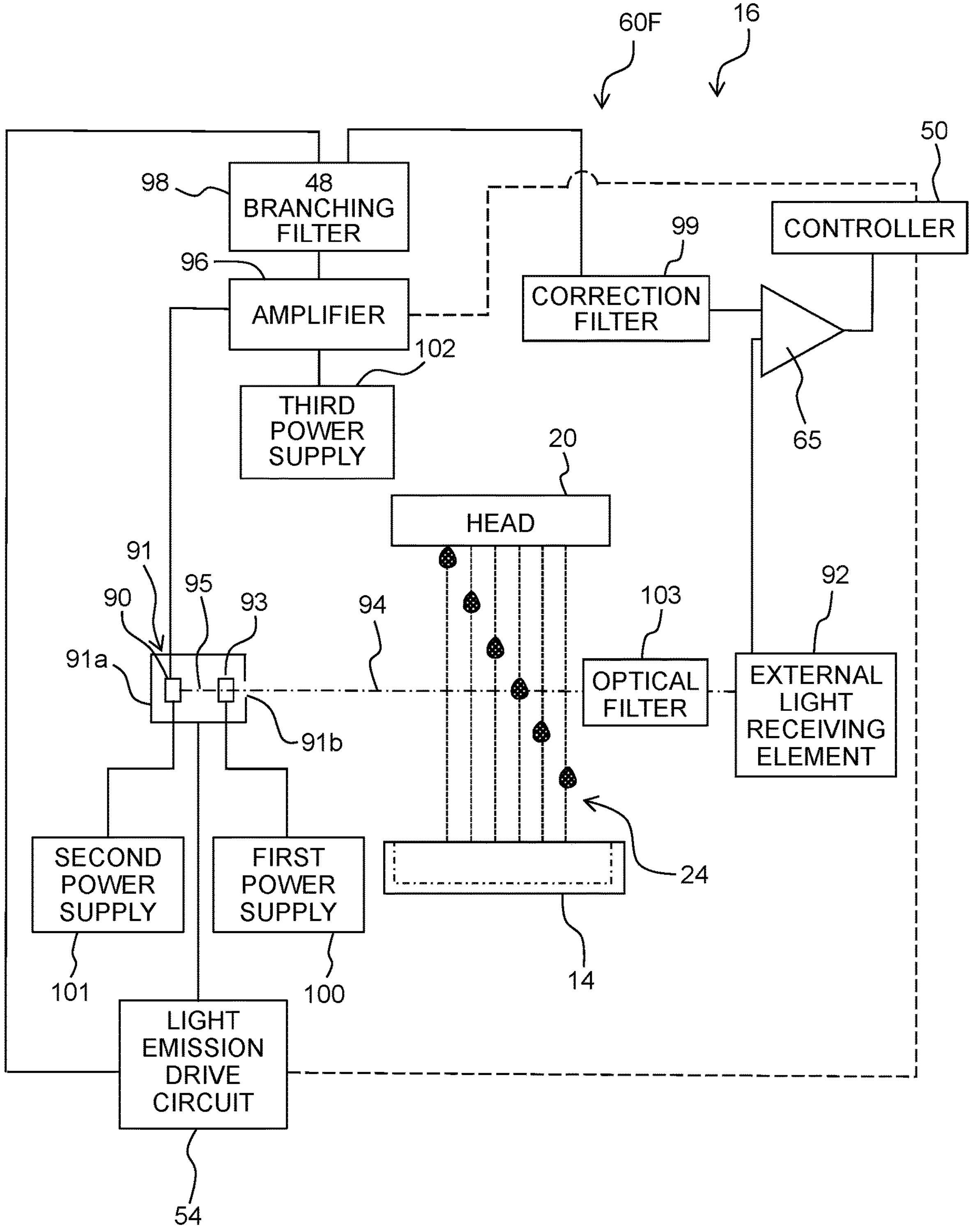

FIG. 11 is a schematic diagram of an inspection section 60F of an inkjet printer 10.

FIRST EMBODIMENT

<Configuration of Inkjet Printer 10>

Figure 1:
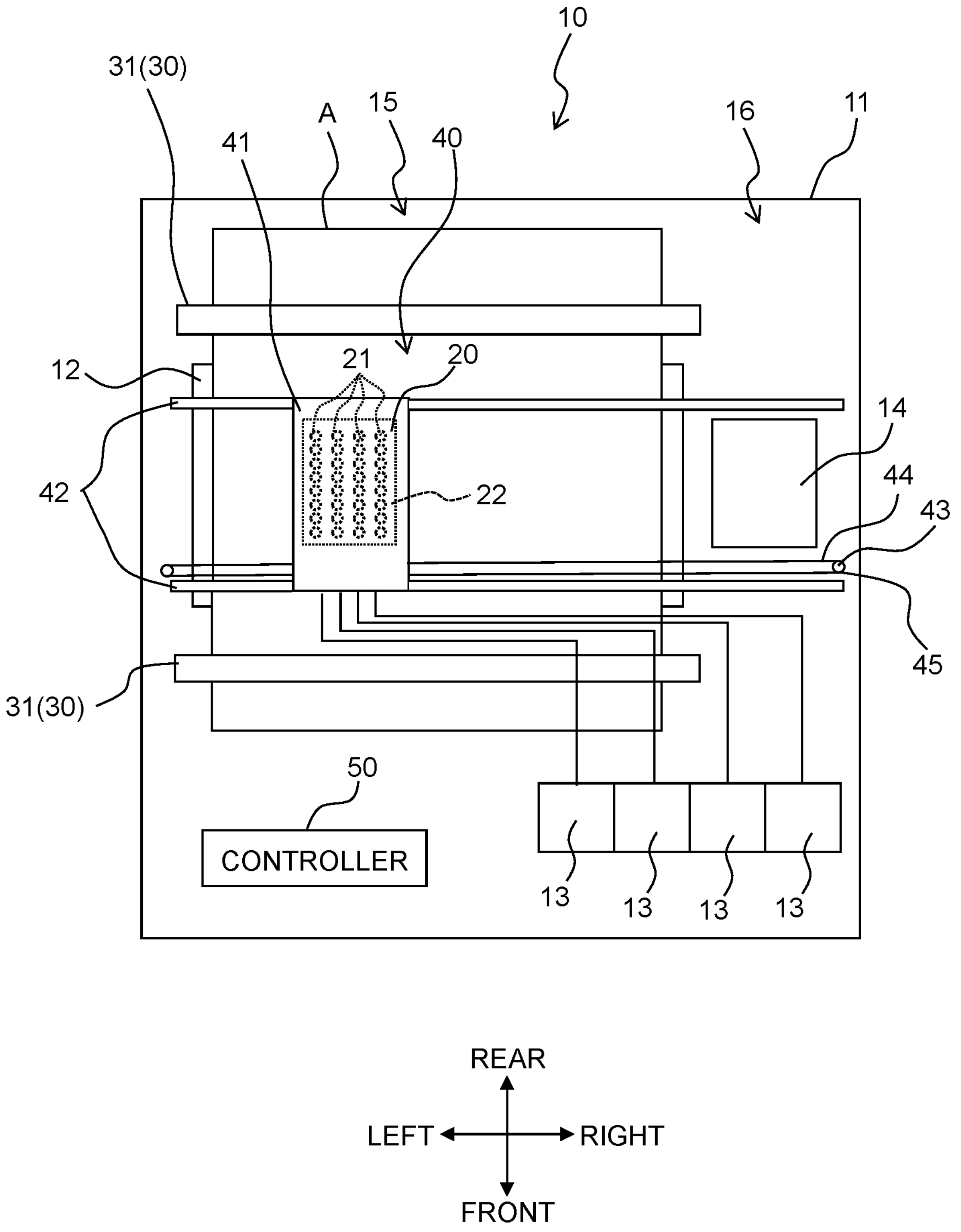
FIG. 1 is a schematic diagram of an inkjet printer 10.

An inkjet printer 10 according to a first embodiment, as depicted in FIG. 1, prints an image on a printing medium A with ink by ejecting ink from a nozzle 21 of a head 20. The print medium A is, for example, a sheet of paper, fabric, or the like.

The inkjet printer 10 is a serial head type, and includes the head 20, a housing 11, a platen 12, a tank 13, a receiving section 14, an inspection section 60 (FIG. 3), a conveyor 30, a scanning device 40, and a controller 50. A direction in which the print medium A is conveyed by the conveyor 30 is referred to as a front-rear direction. A direction intersecting (for example, orthogonal to) the front-rear direction and in which the head 20 is moved by the scanning device 40 is referred to as a left-right direction. Also, a direction intersecting (for example, orthogonal to) the front-rear direction and the left-right direction is referred to as an up-down direction. However, the arrangement of the inkjet printer 10 is not limited to this. Also, the inkjet printer 10 may be a line head type. In this case, the printing device 10 does not include the scanning device 40, and the head 20 does not move and has a size that is longer than the length of the printing medium A in the left-right direction.

The housing 11 accommodates the head 20, the platen 12, the tank 13, the receiving section 14, the inspection section 60, the conveyor 30, the scanning device 40, and the controller 50 therein. Inside the housing 11, a printing area 15 and a maintenance area 16 are provided side by side with each other in the left-right direction. For example, the maintenance area 16 is positioned to the right of the printing area 15. The platen 12 is positioned in the printing area 15 and has a flat upper surface. The platen 12 defines a distance between the print medium A positioned on the upper surface and a lower surface of the head 20 which is provided opposite to the print medium A.

Figure 2:
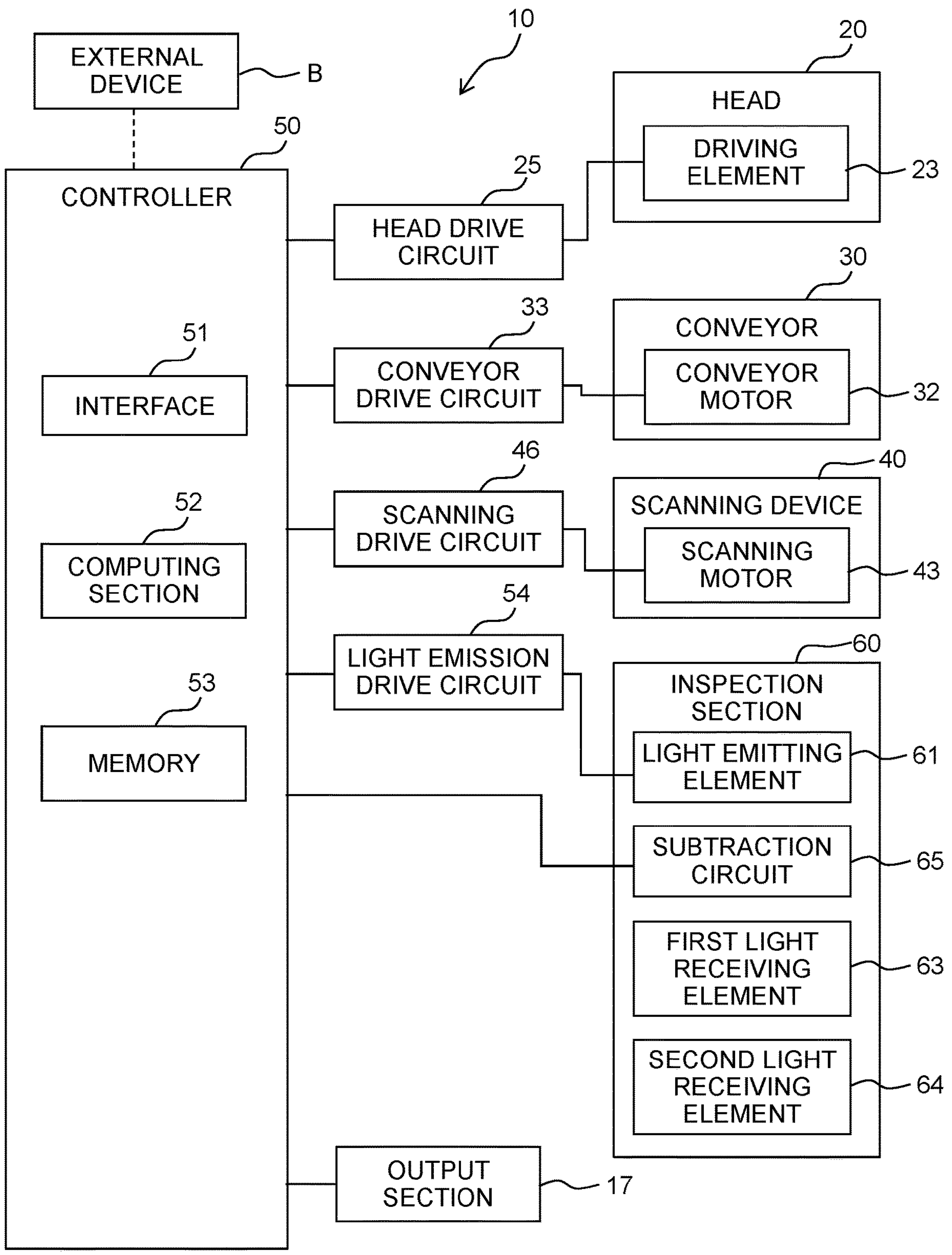
FIG. 2 is a functional block diagram of the inkjet printer 10 of FIG. 1.

A plurality of nozzle rows arranged in the left-right direction is formed on an ejection surface 22, which is the lower surface of the head 20. Each nozzle row has a plurality of nozzles arranged in the front-rear direction. The nozzles 21 included in each nozzle row communicate with the same tank 13, and the nozzles 21 included in different nozzle rows communicate with the different tanks 13. The head 20 also has a plurality of drive elements 23, as depicted in FIG. 2. The drive element 23 is a piezoelectric element, is provided corresponding to the nozzle 21, and applies pressure to ink in the head 20 to eject ink from the nozzle 21. The drive element 23 may be a heating element of a thermal head type or a conductive vibration plate and electrode of an electrostatic head type.

The tank 13 is a container that stores ink, as depicted in FIG. 1. The number of tanks 13, which is the same as the number of ink colors, for example, is four. The tank 13 is connected to the head 20 by a tube, and supplies ink to the corresponding nozzles 21 in the head 20 through the tube. Further, the receiving section 14 is positioned in the maintenance area 16 and is a container whose top is open, and receives ink ejected from the nozzles 21 of the head 20 from the top opening.

The conveyor 30 has, for example, two conveyor rollers 31 and a conveyor motor 32 (FIG. 2). The two conveyor rollers 31 are positioned to sandwich the platen 12 between them in the front-rear direction. The conveyor roller 31 has a shaft extending in the left-right direction and is connected to the conveyor motor 32. The conveyor roller 31 rotates about its axis by the driving of the conveyor motor 32, and conveys the print medium A in the front-rear direction on the platen 12 with respect to the head 20.

The scanning device 40 has a carriage 41, two guide rails 42, a scanning motor 43 and an endless belt 44. The carriage 41 carries the head 20 and is supported by the two guide rails 42 so as to be movable in the left-right direction. The two guide rails 42 extend across the printing area 15 and the maintenance area 16 in the left-right direction so as to sandwich the head 20 between them in the front-rear direction. The endless belt 44 extends in the left-right direction, is attached to the carriage 41, and is attached to the scanning motor 43 through the pulley 45. When the scanning motor 43 is driven, the endless belt 44 runs, and the carriage 41 reciprocates along the guide rail 42 in the left-right direction. Thereby, the carriage 41 moves the head 20 in the left-right direction between the printing area 15 and the maintenance area 16.

<Inspection Section 60>

Figure 3:
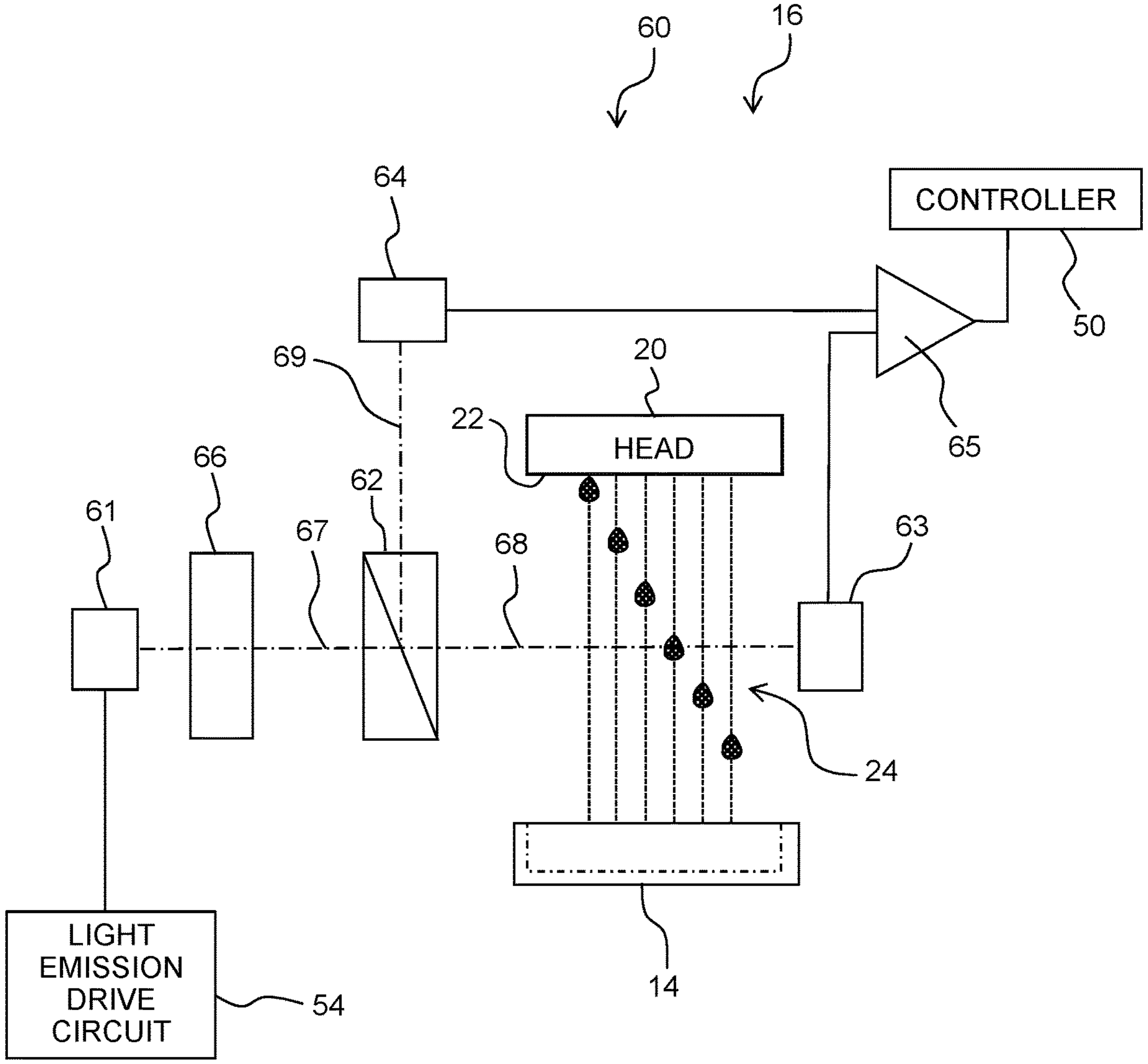
FIG. 3 is a schematic diagram of an inspection section 60 of an inkjet printer 10.

As depicted in FIG. 3, the inspection section 60 is positioned in the maintenance area 16, and includes a light emitting element 61, a beam splitter 62, a first light receiving element 63, a second light receiving element 64, and a subtraction circuit 65, and inspects the ejection state of the head 20. If an optical path 67, a first optical path 68 and a second optical path 69 for light emitted from the light emitting element 61 are not blocked, at least one of the light emitting element 61, the beam splitter 62, the first light receiving element 63, the second light receiving element 64 and the subtraction circuit 65 may be positioned outside the maintenance area 16.

The light emitting element 61 is exemplified by, for example, a laser diode and a light emitting diode, emits light such as parallel rays, and irradiates to the beam splitter 62. A shaping element 66 may be provided between the light emitting element 61 and the beam splitter 62. The shaping element 66 is exemplified by, for example, a lens, an aperture, a polarizing plate or the like, and adjusts at least one of focal distance, shape and polarization of light from the light emitting element 61.

The beam splitter 62 is exemplified by a half mirror, a beam splitter or the like. The beam splitter 62 reflects a part of light based on the wavelength of light, the polarization or the like, transmits the other light, and splits the optical path 67, which is the path of light emitted from the light emitting element 61, into the first optical path 68 and the second optical path 69. For example, the first optical path 68 is the path of light transmitted through the beam splitter 62 and the second optical path 69 is the path of light reflected by the beam splitter 62. Here, the beam splitter 62 splits light of the optical path 67, for example, so that the amount of reflected light and the amount of transmitted light are equal to each other. Therefore, the ratio of the amount of light split by the beam splitter 62 and passing through the first optical path 68 to the amount of light passing through the second optical path 69 is one to one. For example, the amount of light passing through the first optical path 68 is the radiant flux (W) of light transmitted through the beam splitter 62, and the amount of light passing through the second optical path 69 is the radiant flux (W) of light reflected by the beam splitter 62.

The first optical path 68 is provided on the same straight line as the extension line of the optical path 67 from the light emitting element 61 to the beam splitter 62. The first optical path 68 is positioned between the head 20 and the receiving section 14 in the up-down direction, and is provided so as to pass through the flying area 24. The flying area 24 is an area between the head 20 located in the maintenance area 16 and the receiving section 14, and is the area where the ink ejected from the nozzles 21 flies. The direction in which ink flies and the first optical path 68 intersect (for example, orthogonal to) each other.

The second optical path 69 is inclined with respect to the optical path 67 from the light emitting element 61 to the beam splitter 62. The second optical path 69 and its extension line intersect (for example, orthogonal to) the first optical path 68 and its extension line. The second optical path 69 is provided outside the flying area 24 so as not to pass through the flying area 24.

The first light receiving element 63 and the second light receiving element 64 are exemplified by photodiodes, phototransistors, or the like and receive light. The first light receiving element 63 and the second light receiving element 64 are connected to the subtraction circuit 65. The first light receiving element 63 is positioned on the first optical path 68, receives light that has passed through the first optical path 68, and outputs a first light receiving signal C (FIG. 4A), which is an electrical signal corresponding to the amount of received light, to the subtraction circuit 65. The second light receiving element 64 is positioned on the second optical path 69, receives light that has passed through the second optical path 69, and outputs a second light receiving signal D (FIG. 4B), which is an electrical signal corresponding to the amount of received light, to the subtraction circuit 65.

The subtraction circuit 65 includes, for example, an operational amplifier. The subtraction circuit 65, to which the first light receiving signal C from the first light receiving element 63 and the second light receiving signal D from the second light receiving element 64 are input, subtracts either one of the voltage of the first light receiving signal C and the voltage of the second light receiving signal D from the other voltage, and obtains a difference. In this way, the subtraction circuit 65, by obtaining the difference between the first light receiving signal C and the second light receiving signal D, removes noise in which the first light receiving signal C and the second light receiving signal D are correlated with each other from the first light receiving signal C.

Also, the subtraction circuit 65 is connected to the controller 50 and outputs a difference signal E (FIG. 4C), which is an electrical signal of the difference, to the controller 50. The subtraction circuit 65 may be configured with a transistor or an FET instead of the operational amplifier. Also, the subtraction circuit 65 may be, for example, a differential amplifier circuit, and may output the difference signal E amplified by an arbitrary amplification factor of 1 or more to the controller 50.

<Controller>

The controller 50 is a computer, and includes an interface 51, a computing section 52, and a memory 53, as depicted in FIG. 2. The interface 51 receives various data such as image data or the like from an external device B such as a computer, a camera, a communication network, a recording medium, a display, a printer or the like. The image data is raster data or the like representing an image to be printed on the print medium A by ink ejected from the head 20. The controller 50 may be configured with a single device, or may be configured with a plurality of distributed devices so that they cooperate to operate the printing device 10.

The memory 53 is a memory accessible from the computing section 52 and includes a RAM and a ROM. The RAM temporarily memorizes various data such as image data and data converted by the computing section 52 or the like. The ROM memorizes programs for performing various data processing, predetermined data, and the like. The program may be memorized in an external storage medium different from the memory 53 and accessible from the computing section 52, such as a CD-ROM.

The computing section 52 includes, for example, at least one of a processor such as a CPU and the like and an integrated circuit such as an ASIC and the like. The computing section 52 controls each section by executing a program stored in the memory 53, and executes various operations such as a printing operation, a judging operation and the like. Details of various operations will be described later.

The controller 50 is connected to the drive element 23 of the head 20 via a head drive circuit 25. The controller 50 outputs a control signal for the drive element 23 to the head drive circuit 25 based on the image data, and the head drive circuit 25 generates and outputs a drive signal based on the control signal and outputs to the drive element 23. The drive element 23 is driven according to the drive signal, and ink is ejected from the nozzles 21 of the head 20.

The controller 50 is also connected to the conveyor motor 32 of the conveyor 30 via the conveyor drive circuit 33 and controls the driving of the conveyor motor 32. Thereby, the convey of the print medium A by the conveyor 30 is controlled. Further, the controller 50 is connected to the scanning motor 43 of the scanning device 40 via a scanning drive circuit 46 and controls the driving of the scanning motor 43. Thereby, the movement of the head 20 by the scanning device 40 is controlled. Also, the controller 50 is connected to the light emitting element 61 of the inspection section 60 via a light emission drive circuit 54 and controls the driving of the light emitting element 61. Thereby, the light emission of the light emitting element 61 is controlled.

<Printing Operation>

In the inkjet printer 10 like this, the controller 50 obtains image data from the external device B and executes the printing operation based on the image data. For example, in a path process, the controller 50 moves the head 20 to the printing area 15 and ejects ink from the nozzles 21 of the head 20 onto the printing medium A on the platen 12 while moving the head 20 to the right or left in the printing area 15. Then, the controller 50 causes the print medium A to be conveyed forward in a conveyor process. In this way, the inkjet printer 10 alternately repeats the path process and the conveyor process, and advances the printing operation of printing an image on the printing medium A with the ink ejected from the nozzles 21 in the printing area 15.

<Judging Operation>

In the inkjet printer 10, the controller 50 executes a judging operation to judge the ejection state of ink from the head 20. Specifically, the controller 50 causes the light emitting element 61 of the inspection section 60 to emit light. Thereby, light from the light emitting element 61 passes through the shaping element 66 and reaches the beam splitter 62, and the optical path 67 from the light emitting element 61 is split into the first optical path 68 and the second optical path 69 by the beam splitter 62. Light of the first optical path 68 is received by the first light receiving element 63, and the first light receiving element 63 outputs the first light receiving signal C corresponding to the amount of received light to the subtraction circuit 65. Also, light of the second optical path 69 is received by the second light receiving element 64, and the second light receiving element 64 outputs the second light receiving signal D to the subtraction circuit 65 according to the amount of received light. The subtraction circuit 65 obtains a difference by subtracting either one of the voltage of the first light receiving signal C and the second light receiving signal D from the other voltage, as the difference between the amount of received light by the first light receiving element 63 and the amount of received light by the second light receiving element 64, and outputs the difference signal E to the controller 50.

Here, the controller 50 moves the head 20 to the maintenance area 16, positions the head 20 on the receiving section 14, and drives the drive element 23 to eject a predetermined amount of ink. On the other hand, when ink is not ejected from the head 20, the amount of received light by the first light receiving element 63 is equal or substantially equal to the amount of light of the first optical path 68, and the amount of received light by the second light receiving element 64 is equal or substantially equal to the amount of light of the second optical path 69. Therefore, when the ratio of the amount of light of the first optical path 68 to the amount of light of the second optical path 69 is one to one, the amount of received light by the first light receiving element 63 and the amount of received light by the second light receiving element 64 are equal or substantially equal and the difference is less than a first predetermined value. By obtaining the difference in this way, the correlated noise of the first light receiving signal C and the second light receiving signal D is removed from the difference signal E.

On the other hand, when ink is ejected from the nozzle 21 of the head 20, ink flies from the head 20 to the flying area 24, passes through the first optical path 68 in the flying area 24, and enters the receiving section 14. Ink passing through the first optical path 68 blocks the first optical path 68 of light emitted from the light emitting element 61 and transmitted through the beam splitter 62. Thereby, the amount of received light by the first light receiving element 63 is reduced from the amount of light of the first optical path 68 between the light emitting element 61 and the flying area 24. Thereby, as depicted in FIG. 4A, the first light receiving signal C of the first light receiving element 63 includes a peak C1 corresponding to the decrease in the amount of received light due to the ejected ink in addition to noise C2.

On the other hand, since the second optical path 69 does not pass through the flying area 24 where ink ejected from the nozzle 21 flies, the amount of received light by the second light receiving element 64 is equal or substantially equal to the amount of light of the second optical path 69. Therefore, as depicted in FIG. 4B, the second light receiving signal D of the second light receiving element 64 does not include a peak corresponding to the decrease in the amount of received light due to the ejected ink, but includes the noise C2. Therefore, as depicted in FIG. 4C, the difference signal E between the first light receiving signal C and the second light receiving signal D by the subtraction circuit 65 depicts the peak C1 from which the noise C2 has been removed. This peak C1 corresponds to the amount of ejected ink that is ejected from the head 20 and blocks the first optical path 68.

In this manner, the controller 50 executes the judging operation to judge the ejection state of ink by the head 20 based on the difference between the amount of received light by the first light receiving element 63 and the amount of received light by the second light receiving element 64. In this judging operation, for example, the controller 50 judges whether the difference is less than the first predetermined value. If the difference is less than the first predetermined value, the controller 50 judges that there is no decrease or almost no decrease in the amount of received light by the first light receiving element 63 and that the first optical path 68 is not blocked by ink, that is, the controller 50 judges a non-ejection in which ink is not ejected from the head 20.

On the other hand, if the difference is greater than or equal to the first predetermined value, the controller 50 judges whether or not the difference is greater than or equal to a second predetermined value that is larger than the first predetermined value. The second predetermined value corresponds to the amount of decrease in the amount of received light when the predetermined amount of ink blocks the first optical path 68. Therefore, if the difference is greater than or equal to the first predetermined value and less than the second predetermined value, the controller 50 judges that the amount of ejected ink is less than the predetermined amount and that there is an ink ejection failure. On the other hand, if the difference is equal to or greater than the second predetermined value, the controller 50 judges a normal ejection in which the predetermined amount of ink is ejected.

In this way, for example, in the inspection section 60 unevenness in the amount of light may occur, and noise may occur in the amount of received light of the first light receiving element 63 and the second light receiving element 64. Even in such a case, noise in the difference signal can be reduced by obtaining the difference between the amount of received light by the first light receiving element 63 and the amount of received light by the second light receiving element 64. Therefore, for example, even when the size of the ink droplets passing through the first optical path 68 is smaller than the size of light of the first optical path 68, as depicted in FIG. 4C, a peak corresponding to the amount of ejected ink can be extracted from the difference signal, and the accuracy of the judgement of the ejection state of ink by the head 20 can be improved.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

Hereinafter, modifications of the first embodiment will be described with examples. The first to sixth modifications depicted below are merely examples, and the modifications of the first embodiment are not limited to the following modifications. Furthermore, the following modifications may be combined appropriately.

<First Modification>

An inspection section 60A of an inkjet printer 10 according to a first modification as depicted in FIG. 5 includes a guard 70 provided so as to across the first optical path 68, that separates the beam splitter 62 and the flying area 24, and that also has a passing portion through which light passing through the first optical path 68 can pass.

The guard 70 has a first portion 71. The first portion 71 is positioned between the beam splitter 62 and the flying area 24. The first portion 71 is a flat plate shape and spreads larger than the size of the beam splitter 62 in a direction that intersects (for example, orthogonal to) the first optical path 68. The first portion 71 has a first opening 72 as the passing portion through which light of the first optical path 68 can pass. The first opening 72 penetrates the first portion 71 in a direction parallel to the first optical path 68.

Since the beam splitter 62 is close to the flying area 24, when ink flies from the head 20 to the receiving area 14 in the flying area 24, ink mist scatters and easily adheres to the beam splitter 62. On the other hand, since the scattering of the mist from the flying area 24 to the beam splitter 62 is blocked by the guard 70, the adhesion of the ink mist to the beam splitter 62 can be reduced. Therefore, decreases in the amount of received light by the first light receiving element 63 and the second light receiving element 64 from the light emitting element 61 via the beam splitter 62 due to ink adhered to the beam splitter 62 can be reduced by the guard 70. Therefore, it is possible to suppress deterioration in the accuracy of judgement of the ejection state of ink by the head 20.

The guard 70 may also have a second portion 73. The second portion 73 is positioned between the beam splitter 62 and the second light receiving element 64. The second portion 73 is a flat plate shape and spreads larger than the size of the beam splitter 62 in a direction that intersects (for example, orthogonal to) the second optical path 69. The second portion 73 is connected to the first portion 71. The second portion 73 has a second opening 74 through which light of the second optical path 69 can pass. The second opening 74 penetrates the second portion 73 in a direction parallel to the second optical path 69. The adhesion of the scattered ink mist to the beam splitter 62 can be reduced by the second portion 73, thereby it is possible to suppress deterioration in the accuracy of judgement of the ejection state of ink by the head 20.

Additionally, the guard 70 may have a third portion 75. The third portion 75 is positioned between the beam splitter 62 and the light emitting element 61. The third portion 75 is a flat plate shape and spreads larger than the size of the beam splitter 62 in a direction that intersects (for example, orthogonal to) the optical path 67. The third portion 75 is connected to the second portion 73. The third portion 75 also has a third opening 76 through which light of the optical path 67 can pass. The third opening 76 penetrates the third portion 75 in a direction parallel to the optical path 67. The adhesion of the scattered ink mist to the beam splitter 62 can be reduced by the third portion 75, thereby it is possible to suppress deterioration in the accuracy of judgement of the ejection state of ink by the head 20.

Furthermore, the guard 70 may have a fourth portion 77 that surrounds the circumference of the beam splitter 62 in addition to at least one of the first to third portions 71 to 75. The fourth portion 77 faces, for example, in the beam splitter 62 which has six surfaces, at least one of the three surfaces of the beam splitter 62 other than the three surfaces facing the first to third portions 71 to 75. In this way, by surrounding the circumference of the beam splitter 62 with the guard 70, the adhesion of the scattered ink mist to the beam splitter 62 can be reduced, thereby it is possible to suppress deterioration in the accuracy of judgement of the ejection state of ink by the head 20.

The inkjet printer 10 may include at least one of a first guard 78 for the first light receiving element 63, a second guard 80 for the second light receiving element 64, and a third guard 82 for the light emitting element 61. The first guard 78 for the first light receiving element 63, which is provided so as to across the first optical path 68, separates the first light receiving element 63 and the flying area 24 and also has an opening 79 as a passing portion through which light passing through the first optical path 68 can pass. Furthermore, the first guard 78 may be provided so as to surround the circumference of the first light receiving element 63. By the first guard 78, the adhesion of the scattered ink mist to the first light receiving element 63 can be reduced and it is possible to suppress deterioration in the accuracy of judgement of the ejection state of ink by the head 20.

The second guard 80 for the second light receiving element 64, which is provided so as to across the second optical path 69, separates the second light receiving element 64 and the beam splitter 62 and also has an opening 81 as a passing portion through which light passing through the second optical path 69 can pass. Furthermore, the second guard 80 may be provided so as to surround the circumference of the second light receiving element 64. By the second guard 80, the adhesion of the scattered ink mist to the second light receiving element 64 can be reduced, and it is possible to suppress deterioration in the accuracy of judgement of the ejection state of ink by the head 20.

The third guard 82 for the light emitting element 61, which is provided so as to across the optical path 67, separates the light emitting element 61 and the beam splitter 62 and also has an opening 83 as a passing portion through which light passing through the optical path 67 can pass. Furthermore, the third guard 82 may be provided so as to surround the circumference of the light emitting element 61. By the third guard 82, the adhesion of the scattered ink mist to the light emitting element 61 can be reduced, and it is possible to suppress deterioration in the accuracy of judgement of the ejection state of ink by the head 20.

<Second Modification>

In an inkjet printer 10 according to a second modification, a controller 50 causes the amount of emitted light from the light emitting element 61 to increase as an elapsed time from a predetermined time increases.

Specifically, the amount of emitted light is, for example, the radiant flux (W) emitted from the light emitting element 61 and is controlled by changing the current or voltage supplied to the light emitting element 61 by the controller 50. The predetermined time is a time relating to the inkjet printer 10, and is exemplified for example, by the time when the inkjet printer 10 is shipped, the time when printing is first started or the like, and are stored in the memory 53. The controller 50 measures time from the predetermined time, and executes the judging operation in accordance with the amount of emitted light from the light emitting element 61 based on the elapsed time from the predetermined time.

In this judging operation, if the elapsed time is less than a first predetermined elapsed time, the controller 50 controls the light emitting element 61 to emit light at a first predetermined amount of emitted light. In addition, if the elapsed time is equal to or longer than the first predetermined elapsed time and is less than a second predetermined elapsed time that is longer than the first predetermined elapsed time, the controller 50 controls the light emitting element 61 to emit light at a second predetermined amount of emitted light larger than the first predetermined amount of emitted light. Further, when the elapsed time is equal to or longer than the second predetermined elapsed time, the controller 50 controls the light emitting element 61 to emit light at a third predetermined amount of emitted light larger than the second predetermined amount of emitted light.

In this manner, the controller 50 causes the amount of emitted light from the light emitting element 61 to increase as the elapsed time from the predetermined time increases. Thereby even if the decrease in the amount of emitted light of the light emitting element 61 and the increase in the amount of adhered ink that is adhered to the beam splitter 62 or the like occur as the elapsed time increases, the decreases in the amount of received light by the first light receiving element 63 and the second light receiving element 64 can be reduced. Therefore, it is possible to suppress deterioration in the accuracy of judgement of the ejection state of ink by the head 20.

<Third Modification>

In an inkjet printer 10 according to a third modification, a controller 50 causes the amount of emitted light from the light emitting element 61 to increase as an accumulated time of printing time for printing an image on the print medium A with ink ejected from the nozzles 21 increases.

Specifically, the controller 50 executes a printing operation while controlling the head 20 and the like based on the image data. Here, for example, the controller 50 measures time from the start of driving of the drive element 23 of the head 20 to the end of driving in the printing operation based on the image data as a printing time. Then, the controller 50 measures the printing time each time the printing operation is executed, adds the measured printing time to the stored printing time stored in the memory 53, and stores it in the memory 53. In this way, the controller 50 sequentially adds up the printing times to obtain the accumulated time of printing time. Then, the controller 50 executes the judging operation in accordance with the amount of emitted light of the light emitting element 61 based on the accumulated time of printing time.

In this judging operation, if the accumulated time is less than a first predetermined accumulated time, the controller 50 controls the light emitting element 61 to emit light at a first predetermined amount of emitted light. Further, if the accumulated time is equal to or longer than the first predetermined accumulated time and is less than a second predetermined accumulated time that is longer than the first predetermined accumulated time, the controller 50 controls the light emitting element 61 to emit light at a second predetermined amount of emitted light larger than the first predetermined amount of emitted light. Furthermore, if the accumulated time is equal to or longer than the second predetermined accumulated time, the controller 50 controls the light emitting element 61 to emit light at a third predetermined amount of emitted light larger than the second predetermined amount of emitted light.

In this manner, the controller 50 causes the amount of emitted light from the light emitting element 61 to increase as the accumulated time of printing time increases. As a result, even if the decrease in the amount of emitted light of the emitting element 61 and the increase in the amount of adhered ink adhered to the beam splitter 62 or the like occur as the accumulated time of printing time increases, the decreases in the amount of received light by the first light receiving element 63 and the second light receiving element 64 can be reduced. Therefore, it is possible to suppress deterioration in the accuracy of judgement of the ejection state of ink by the head 20.

<Fourth Modification>

In an inkjet printer 10 according to a fourth modification, a controller 50 causes the amount of emitted light from the light emitting element 61 to increase as the number of executions of the judging operation increases.

Specifically, the controller 50 executes a judging operation of the ejection state of the head 20 by the inspection section 60 (60A). The controller 50 increments the number of judging operations stored in the memory 53 each time the judging operation is executed, and stores it in the memory 53. The controller 50 sequentially adds up the number of judging operations, and obtains the number of executions that is the accumulated number of judging operations. Then, the controller 50 executes the judging operation in accordance with the amount of emitted light of the light emitting element 61 based on the number of executions of the judging operation.

In this judging operation, if the number of executions of the judging operation is less than a first predetermined number of times, the controller 50 controls the light emitting element 61 to emit light at a first predetermined amount of emitted light. Further, if the number of executions is equal to or greater than the first predetermined number of times and is less than a second predetermined number of times that is greater than the first predetermined number of times, the controller 50 controls the light emitting element 61 to emit light at a second predetermined amount of emitted light that is larger than the first predetermined amount of emitted light. Furthermore, if the number of executions is equal to or greater than the second predetermined number of times, the controller 50 controls the light emitting element 61 to emit light at a third predetermined amount of emitted light that is larger than the second predetermined amount of emitted light.

In this manner, the controller 50 causes the amount of emitted light from the light emitting element 61 to increase as the number of executions of the judging operation increases. As a result, even if the decrease in the amount of emitted light of the light emitting element 61 and the increase in the amount of adhered ink adhered to the beam splitter 62 or the like occur as the number of executions of the judging operation increases, the decrease in the amount of received light by the first light receiving element 63 and the second light receiving element 64 can be reduced. Therefore, it is possible to suppress deterioration in the accuracy of judgement of the ejection state of ink by the head 20.

<Fifth Modification>

An inkjet printer 10 according to a fifth modification includes an output section 17 as depicted in FIG. 2. A controller 50 causes the output section 17 to output information regarding cleaning or replacement of the beam splitter 62 when the number of executions of the judging operation reaches a predetermined number of times.

The output section 17 is exemplified by a display device such as a display that displays images, and a speaker that outputs audio or the like. The output section 17 is connected to the controller 50 and information output is controlled by the controller 50. The controller 50 increments the number of judging operations stored in the memory 53 each time the judging operation is executed, stores it in the memory 53, sequentially adds up the number of judging operations, and obtains the number of executions.

Here, for example, if the number of executions of the judging operation is less than a third predetermined number of times, the control unit 50 assumes that there is no decrease in the amount of received light or the decrease is small, and does not cause the output section 17 to output information regarding cleaning or replacement of the beam splitter 62. If the number of executions is equal to or greater than the third predetermined number of times and is less than a fourth predetermined number of times which is greater than the third predetermined number of times, the controller 50 assumes that the amount of received light is decreasing, and causes the output section 17 to output information prompting cleaning of the beam splitter 62. Furthermore, if the number of executions is equal to or greater than the fourth predetermined number of times, the control unit 50 assumes that the decrease in the amount of received light is large, and causes the output section 17 to output information prompting replacement of the beam splitter 62.

In this manner, the controller 50 causes the output unit 17 to output information regarding cleaning or replacement of the beam splitter 62 according to the number of executions of the judging operation. Even if the amount of adhered ink adhered to the beam splitter 62 increases as the number of executions increases, the decreases in the amount of received light by the first light receiving element 63 and the second light receiving element 64 is reduced by the cleaning or replacement of the beam splitter 62. Therefore, it is possible to suppress deterioration in the accuracy of judgment of the ejection state of ink by the head 20.

<Sixth Modification>

An inkjet printer 10 according to a sixth modification includes an output section 17. When at least one of the amount of received light by the first light receiving element 63 and the amount of received light by the second light receiving element 64 becomes less than a predetermined amount of light, the controller 50 causes the output section 17 to output information regarding cleaning or replacement of the beam splitter 62.

The controller 50 is connected to the first light receiving element 63 and the second light receiving element 64, as depicted in FIG. 6. The first light receiving element 63 and the second light receiving element 64 output electrical signals corresponding to the amount of received light to the subtraction circuit 65 and the controller 50. The controller 50 executes the judging operation of the ejection state of ink by the head 20 according to an electrical signal from the subtraction circuit 65. Along with this, the controller 50 causes the output section 17 to output information regarding cleaning or replacement of the beam splitter 62 based on the electrical signals corresponding to the amount of received light by the first light receiving element 63 and the second light receiving element 64. Further, the controller 50 may be connected to at least one of the first light receiving element 63 and the second light receiving element 64, and based on an electrical signal corresponding to the amount of received light by the light receiving element, the controller 50 may cause the output section 17 to output information regarding cleaning or replacement of the beam splitter 62.

Here, for example, if the amount of received light by at least one of the first light receiving element 63 and the second light receiving element 64 is equal to or greater than a first predetermined amount of light, the controller 50 assumes that there is no decrease in the amount of received light or the decrease is small and does not cause the output section 17 to output information regarding cleaning or replacement of the beam splitter 62. If the amount of received light is less than the first predetermined amount of light and equal to or larger than a second predetermined amount of light, which is less than the first predetermined amount of light, the controller 50 assumes that the amount of received light is decreasing, and cause the output section 17 to output information prompting cleaning of the beam splitter 62. Furthermore, if the amount of received light is less than the second predetermined amount of light, the controller 50 assumes that the decrease in the amount of received light is large, and causes the output section 17 to output information prompting replacement of the beam splitter 62.

In this manner, the controller 50 causes the output section 17 to output information regarding cleaning or replacement of the beam splitter 62 according to at least one of the amount of received light by the first light receiving element 63 and the amount of received light by the second light receiving element 64. The decrease in the amount of emitted light of the light emitting element 61 and the decreases in the amount of received light of the first light receiving element 63 and the second light receiving element 64 due to the increase in the amount of adhered ink adhered to the beam splitter 62 or the like are reduced by the cleaning or replacement of the beam splitter 62. Therefore, it is possible to suppress deterioration in the accuracy of judgement of the ejection state of ink by the head 20.

SECOND EMBODIMENT

<Configuration of Inkjet Printer>

An inkjet printer 10 according to a second embodiment includes the head 20 having the nozzle 21 that ejects ink, a light emitting element 93 that emits and irradiates light in a first direction and a second direction different from the first direction, in addition, a light irradiation device 91 incorporating an internal light receiving element 90 that receives light irradiated in the first direction by the light emitting element 93, an external light receiving element 92 that receives light irradiated in the second direction from the light irradiation device 91 by the light emitting element 93, the subtraction circuit 65 that obtains a difference between a light receiving signal corresponding to an amount of received light by the internal light receiving element 90 and a light receiving signal corresponding to an amount of received light by the external light receiving element 92, and the controller 50. An optical path, which is a path of light irradiated from the light irradiation device 91 and received by the external light receiving element 92, is provided so as to pass through the flying area 24 in which ink ejected from the nozzle 21 flies. The controller 50 executes a judging operation that judges an ejection state of ink by the head 20 based on the difference.

Specifically, as depicted in FIG. 1, the inkjet printer 10 includes the head 20, the housing 11, the platen 12, the tank 13, the receiving section 14, an inspection section 60B (FIG. 7), the conveyor 30, the scanning device 40 and the controller 50. The inspection section 60B is positioned in the maintenance area 16, as depicted in FIG. 7, and includes the light irradiation device 91 incorporating the light emitting element 93 and the internal light receiving element 90, the external light receiving element 92 and the subtraction circuit 65, and inspects the ejection state of ink by the head 20.

The light irradiation device 91 has a case 91*a* and accommodates the light emitting element 93 and the internal light receiving element 90 in the case 91*a*. The light emitting element 93 is exemplified by, for example, a light emitting body in a laser diode and a light emitting body in a light emitting diode. The light emitting element 93 is connected to the controller 50 via the light emission drive circuit 54, and the driving is controlled by the light emission drive circuit 54 and the controller 50. The light emitting element 93 emits light such as parallel rays, and irradiates the emitted light in both the first direction and the second direction. The first direction and the second direction are directions different from each other. For example, the first direction is opposite to the second direction, and in this case the angle formed by the first direction and the second direction is 180 degrees.

An irradiation port 91*b* is provided in the case 91*a*. An external optical path 94, which is an optical path of light irradiated in the second direction from the light emitting element 93 in the case 91*a*, passes through the irradiation port 91*b* and extends outside the case 91*a*. This external optical path 94 is provided so as to pass through the flying area 24 in which ink from the head 20 flies over the receiving portion 14. The external optical path 94 intersects (for example, orthogonal to) the direction in which ink is ejected from the head 20 in the flying area 24.

An internal optical path 95, which is an optical path of light irradiated in the first direction from the light emitting element 93, is provided inside the case 91*a*. The internal optical path 95 is positioned on the same straight line as the extension line of the external optical path 94. The internal optical path 95 is provided outside the flying area 24 so as not to pass through the flying area 24 outside the case 91*a*. A commercially available laser diode generally has the light emitting element 93 and the internal light receiving element 90 in the case 91*a* for the purpose of making the amount of output light constant.

The external light receiving element 92 is exemplified by, for example, a photodiode and a phototransistor and the like, is positioned outside the light irradiation device 91, and is connected to the subtraction circuit 65. The external light receiving element 92 is positioned on the external optical path 94, receives light that has passed through the external optical path 94, and outputs an external light receiving signal, which is an electrical signal corresponding to an amount of received light, to the subtraction circuit 65. Further, the internal light receiving element 90 is exemplified by a photodiode and a phototransistor and the like, for example, is positioned in the light irradiation device 91 and is connected to the subtraction circuit 65. The internal light receiving element 90 is positioned on the internal optical path 95, receives light that has passed through the internal optical path 95, and outputs an internal light receiving signal, which is an electrical signal corresponding to an amount of received light, to the subtraction circuit 65.

The subtraction circuit 65 includes, for example, an operational amplifier. The subtraction circuit 65, to which the external light receiving signal from the external light receiving element 92 and the internal light receiving signal from the internal light receiving element 90 are input, subtracts either one of the voltage of the external light receiving signal and the voltage of the internal light receiving signal from the other voltage, and obtains a difference. In this way, the subtraction circuit 65, by obtaining the difference between the external light receiving signal and the internal light receiving signal, removes noise in which the external light receiving signal and the internal light receiving signal are correlated with each other from the external light receiving signal. Then, the subtraction circuit 65 outputs the difference signal, which is an electrical signal of the difference, to the controller 50. The subtraction circuit 65 may be configured with a transistor or FET (Field Effect Transistor) instead of the operational amplifier. Also, the subtraction circuit 65 may be, for example, a differential amplifier circuit, and may output a differential signal amplified by an arbitrary amplification factor of 1 or more to the control unit 50.

<Judging Operation>

In the inkjet printer 10, the controller 50 executes a judging operation that judges the ejection state of ink from the head 20 based on the difference signal. Specifically, the controller 50 causes the light emitting element 93 of the light irradiation device 91 in the maintenance area 16 to emit light. As a result, the light irradiated from the light emitting element 93 in the second direction is irradiated outside the light irradiation device 91 through the irradiation port 91*b*, passes through the external optical path 94, and is received by the external light receiving element 92. The external light receiving element 92 outputs the external light receiving signal corresponding to the amount of received light to the subtraction circuit 65.

The light irradiated from the light emitting element 93 in the second direction passes through the internal optical path 95 in the light irradiation device 91 and is received by the internal light receiving element 90. The internal light receiving element 90 outputs the internal light receiving signal corresponding to the amount of received light to the subtraction circuit 65. Then, the subtraction circuit 65 obtains a difference by subtracting either one of the voltage of the external light receiving signal and the voltage of the internal light receiving signal from the other voltage as the difference between the amount of received light by the external light receiving element 92 and the amount of received light by the internal light receiving element 90, and outputs the difference to the controller 50.

Here, the controller 50 drives the drive element 23 so that a predetermined amount of ink is ejected from the head 20 positioned on the receiving unit 14 in the maintenance area 16. If ink is not ejected from the head 20 in response to the driving of the drive element 23, light of the external optical path 94 passing through the ink flying area 24 is not blocked by ink. Therefore, the amount of received light by the external light receiving element 92 is equal or substantially equal to the amount of light of the external optical path 94, and the amount of received light by the internal light receiving element 90 is equal or substantially equal to the amount of light of the internal optical path 95. For example, when the ratio of the amount of light of the external optical path 94 to the amount of light of the internal optical path 95 is one to one, the amount of received light by the external light receiving element 92 and the amount of received light by the internal light receiving element 90 are equal or substantially equal, and the difference between them becomes smaller than the third predetermined value. In this way, by obtaining the difference, the correlated noise of the external light receiving signal and the internal light receiving signal is removed from the external light receiving signal.

On the other hand, when ink is ejected from the head 20 in response to the driving of the drive element 23, ink flies from the head 20 to the flying area 24, passes through the external optical path 94 in the flying area 24, and enters the receiving section 14. Ink passing through the external optical path 94 blocks light in the external optical path 94, and the amount of received light by the external light receiving element 92 is decreased less than the amount of light of the external optical path 94 between the light emitting element 93 and the flying area 24. As a result, the external light receiving signal corresponding to the amount of received light of the external light receiving element 92 includes, in addition to noise, a peak corresponding to the decrease in the amount of received light due to the ejected ink.

On the other hand, since the internal optical path 95 does not pass through the flying area 24, the amount of received light by the internal light receiving element 90 is equal or substantially equal to the amount of light of the internal optical path 95. Therefore, the internal light receiving signal of the internal light receiving element 90 does not contain a peak corresponding to the decrease in the amount of received light due to the ejected ink, but contains noise. Therefore, a peak in which noise is removed appears in the difference signal between the external light receiving signal and the internal light receiving signal by the subtraction circuit 65. This peak corresponds to the amount of ejected ink ejected from the head 20 that blocks the external optical path 94.

In this manner, the controller 50 executes the judging operation that judges the ejection state of ink by the head 20 based on the difference between the amount of received light by the external light receiving element 92 and the amount of received light by the internal light receiving element 90. In this judging operation, for example, the controller 50 judges whether or not the difference is less than the third predetermined value. If the difference is less than the third predetermined value, the controller 50 judges that there is no decrease or almost no decrease in the amount of received light by the external light receiving element 92 and that the external optical path 94 is not blocked by ink, that is, the controller 50 judges the non-ejection in which ink is not ejected from the head 20.

On the other hand, if the difference is equal to or greater than the third predetermined value, the controller 50 judges whether or not the difference is equal to or greater than a fourth predetermined value that is greater than the third predetermined value. The fourth predetermined value corresponds to the amount of decrease in the amount of received light when the predetermined amount of ink blocks the external optical path 94. Therefore, if the difference is greater than or equal to the third predetermined value and less than the fourth predetermined value, the controller 50 judges that the amount of ejected ink is less than the predetermined amount and that there is the ink ejection failure. On the other hand, if the difference is equal to or greater than the fourth predetermined value, the controller 50 judges that there is the normal ejection in which the predetermined amount of ink is ejected.

In this manner, by obtaining the difference between the amount of received light by the external light receiving element 92 and the amount of received light by the internal light receiving element 90, noise in the external light receiving signal can be reduced. Therefore, even when the size of ink droplet passing through the external optical path 94 is smaller than the size of light of the external optical path 94, for example, the peak corresponding to the amount of ejected ink can be extracted from the difference signal, the accuracy of judgement of the ejection state of ink by the head 20 can be improved.

Further, the light emitting element 93 irradiates emitted light in two directions. As a result, the emitted light from the light emitting element 93 is received by the external light receiving element 92 and the internal light receiving element 90, and the ejection state of ink is judged in accordance with the difference in the amount of received light. Here, by not using a beam splitting element that splits the light path of light from the light emitting element 93 into the external optical path 94 and the internal optical path 95, the deformation of light due to the beam splitting element and the decrease in the amount of light and the like are suppressed, and the accuracy of judgment of the ejection state of ink can be improved. Furthermore, by not using a beam splitting element, it is possible to reduce the size and cost of the inkjet printer 10.

Hereinafter, modifications of the second embodiment will be described with examples. The seventh to fourteenth modifications depicted below are merely examples, and aspects of modifications of the second embodiment are not limited to the following modifications. Furthermore, the following modifications may be combined appropriately.

<Seventh Modification>

An inspection section 60C (see FIG. 8) of an inkjet printer 10 according to a seventh modification includes an amplifier 96 that amplifies a light receiving signal of one of the light receiving element of the internal light receiving element 90 and the external light receiving element 92. The controller 50, in a state where ink is not ejected from the head 20, executes an obtaining operation to obtain as a first amplification degree, an amplification degree of the amplifier 96 when a component of a predetermined frequency band (for example, a first high frequency component that is a component of a high frequency band of 10 Hz or more) in the difference is minimized. The subtraction circuit 65 obtains as the difference, a difference between the light receiving signal of one of the light receiving element amplified based on the first amplification degree and the light receiving signal of the other light receiving element of the internal light receiving element 90 and the external light receiving element 92.

Specifically, the amplifier 96 is provided between the internal light receiving element 90 and the subtraction circuit 65 and is connected to these as depicted in FIG. 8. The amplifier 96 includes an amplifier circuit that amplifies an electric signal, amplifies the internal light receiving signal of the internal light receiving element 90, and outputs the amplified signal, which is the amplified internal light receiving signal, to the subtraction circuit 65. The subtraction circuit 65 obtains the difference between the amplified signal and the external light receiving signal, and outputs the difference signal to the controller 50. Also, the amplifier 96 is connected to the controller 50 and the amplification degree of the amplifier 96 is controlled by the controller 50. The amplification degree is a ratio of a voltage of the internal light receiving signal input from the internal light receiving element 90 to the amplifier 96 to a voltage of the amplified signal output from the amplifier 96 to the subtraction circuit 65 after the internal light receiving signal is amplified by the amplifier 96.

The controller 50 executes the obtaining operation in a state where ink is not ejected from the head 20 in the maintenance area 16. In this obtaining operation, the controller 50 changes the amplification degree of the amplifier 96 while causing the internal light receiving element 90 and the external light receiving element 92 to receive light from the light emitting element 93. As a result, the internal light receiving signal of the internal light receiving element 90 is amplified according to the amplification degree, and the difference between the amplified signal and the external light receiving signal changes. Here, the controller 50 obtains an amplification degree when a component of a predetermined frequency band (for example, a first high frequency component that is a component of a high frequency band of 10 Hz or more) in the difference is minimized as the first amplification degree.

Subsequently, the controller 50 executes the judging operation. In the judging operation, the controller 50 controls the amplifier 96 to amplify the internal light receiving signal by the first amplification degree. As a result, the amplifier 96 outputs to the subtraction circuit 65 an amplified signal obtained by amplifying the internal light signal with the first amplification degree. Also, the external light receiving element 92 outputs an external light receiving signal to the subtraction circuit 65. Then, the subtraction circuit 65 outputs a difference signal between the amplified signal and the external light receiving signal to the controller 50. This external light receiving signal corresponds to the amount of ink flying in the flying area 24 through which the external optical path 94 passes, that is, the amount of ejected ink by the head 20. Therefore, the controller 50 judges the ejection state of ink by the head 20 based on the difference signal.

In this way, by amplifying the internal light receiving signal by the first amplification degree, it is possible to reduce the deterioration in the accuracy of judgement of the ejection state of ink due to individual differences in each element. That is, the difference between the light receiving signal of the internal light receiving element 90 and the light receiving signal of the external light receiving element 92 is not uniform due to individual differences of the light emitting element 93, the internal light receiving element 90 and the external light receiving element 92. Therefore, the internal light receiving signal of the internal light receiving element 90 is amplified with the first amplification degree so that these noise levels match or approach each other. Noise can be reduced from the external light receiving signal by the amplified internal light receiving signal, and the deterioration in the accuracy of judgement of the ejection state of ink due to individual differences of each element can be reduced. Furthermore, by not using a beam splitting element, it is possible to reduce the size and cost of the inkjet printer 10 while improving the accuracy of judgement of the ejection state of ink.

In the above configuration, the amplifier 96 amplifies the internal light receiving signal, but the external light receiving signal may be amplified by the amplifier 96. In this case, the amplifier 96 is connected to the external light receiving element 92 and the subtraction circuit 65, amplifies the external light receiving signal of the external light receiving element 92 and outputs to the subtraction circuit 65. Then, while changing the amplification degree of the amplifier 96, the controller 50 obtains an amplification degree of the amplifier 96 as the first amplification degree when a component of a predetermined frequency band (for example, a first high frequency component that is a component of a high frequency band of 10 Hz or more) in the difference between the external light receiving signal amplified with the amplification degree and the internal light receiving signal is minimized. Then, the subtraction circuit 65 obtains the difference between the internal light receiving signal and the external light receiving signal amplified with the first amplification degree, and the controller 50 judges the ejection state of ink by the head 20 based on the difference. As a result, it is possible to reduce noise from the internal light receiving signal by the amplified external light receiving signal, and reduce the deterioration in the accuracy of judgement of the ejection state of ink due to individual differences of each element. Furthermore, by not using a beam splitting element, it is possible to reduce the size and cost of the inkjet printer 10 while improving the accuracy of judgement of the ejection state of ink.

<Eighth Modification>

In an inkjet printer 10 according to an eighth modification, the controller 50 executes the obtaining operation at least one of when the light irradiation device 91 is shipped from the factory, when the light irradiation device 91 is installed in the inkjet printer 10, and when the light irradiation device 91 is activated.

During these times, the difference between the internal light receiving signal of the internal light receiving element 90 and the external light receiving signal of the external light receiving element 92 may fluctuate. Therefore, by obtaining the first amplification degree during these times, it is possible to reduce the deterioration in the accuracy of judgement of the ejection state of ink due to individual differences of each element and deterioration over time. Furthermore, by not using a beam splitting element, it is possible to reduce the size and cost of the inkjet printer 10 while improving the accuracy of judgement of the ejection state of ink.

<Nineth Modification>

In an inkjet printer 10 according to a nineth modification, the controller 50 executes a correcting operation to correct a first amplification degree based on the sensitivity of the internal light receiving element 90, which is the ratio of the light receiving signal of the internal light receiving element 90 to the amount of received light by the internal light receiving element 90. The subtraction circuit 65 obtains, as the difference, a difference between the light receiving signal of one of the light receiving element amplified based on the first amplification degree corrected by the correcting operation and the light receiving signal of the other light receiving element.

Specifically, since the light emitting element 93 and the internal light receiving element 90 are incorporated in the light emitting device 91, as the light emission time of the light emitting element 93 increases, a temperature of the internal light receiving element 90 also increases due to the temperature rise of the light emitting element 93. Due to the temperature rise of the internal light receiving element 90, the sensitivity of the internal light receiving element 90, which is the ratio of the internal light receiving signal of the internal light receiving element 90 to the amount of received light by the internal light receiving element 90, changes. Thus, as the light emission time of the light emitting element 93 becomes longer, the changes in the sensitivity of the internal light receiving element 90 becomes greater. Therefore, the controller 50 executes the correcting operation that corrects the first amplification degree based on the sensitivity of the internal light receiving element 90. In the correcting operation, the controller 50 corrects the first amplification degree so that the internal light receiving signal corresponding to the amount of received light by the internal light receiving element 90 may not change as the light emitting time of the light emitting element 93 becomes longer.

Subsequently, the controller 50 executes the judging operation. In the judging operation, the controller 50 controls the amplifier 96 to amplify the internal light receiving signal by the first amplification degree corrected by the correcting operation. For example, the amplifier 96 amplifies the internal light receiving signal by the corrected first amplification degree and outputs the corrected amplified signal to the subtraction circuit 65. Also, the external light receiving element 92 outputs the external light receiving signal to the subtraction circuit 65. Then, the subtraction circuit 65 outputs a difference signal between the corrected amplified signal and the external light receiving signal to the controller 50. Since the external light receiving signal corresponds to the amount of ejected ink by the head 20, the controller 50 judges the ejection state of ink by the head 20 based on the difference signal.

In this way, by amplifying the internal light receiving signal by the first amplification degree, it is possible to reduce the deterioration in the accuracy of judgement of the ejection state of ink due to individual differences of each element. Furthermore, by correcting the first amplification degree according to the sensitivity of the internal light receiving element 90, it is possible to reduce the deterioration in the accuracy of judgement of the ejection state of ink due to the temperature rise of the internal light receiving element 90. Furthermore, by not using a beam splitting element, it is possible to reduce the size and cost of the inkjet printer 10 while improving the accuracy of judgement of the ejection state of ink.

In the above configuration, the internal light receiving signal is amplified by the amplifier 96, but the external light receiving signal may be amplified by the amplifier 96. In this case, the amplifier 96 is connected between the external light receiving element 92 and the subtraction circuit 65. The controller 50 executes the correcting operation to correct the first amplification degree based on the sensitivity of the internal light receiving element 90, and causes the amplifier 96 to amplify the external light receiving signal with the corrected first amplification degree. Then, the subtraction circuit 65 may obtain, as the difference, a difference between the external light receiving signal amplified based on the first amplification degree corrected by the correcting operation and the internal light receiving signal.

<Tenth Modification>

In an inspection section 60D (see FIG. 9) of an inkjet printer 10 according to a tenth modification, a high frequency filter 97 that passes a first high frequency component of the light receiving signal of one of the internal light receiving element 90 and the external light receiving element 92 is included. The subtraction circuit 65 obtains a difference between the first high frequency component of the one light receiving element and the light receiving signal of the other light receiving element as the difference.

Specifically, the high frequency filter 97 is provided between the amplifier 96 and the subtraction circuit 65, and is connected to these, as depicted in FIG. 9. The high frequency filter 97 passes a component of a predetermined frequency band (for example, a first high frequency component that is a component of a high frequency band of 10 Hz or more) in the internal light receiving signal amplified by the amplifier 96 with the first amplification degree and outputs to the subtraction circuit 65. The subtraction circuit

65 outputs a difference signal between the first high frequency component and the external light receiving signal to the controller 50. The controller 50 executes a judging operation. In the judging operation, since the external light receiving signal corresponds to the amount of ejected ink by the head 20, the controller 50 judges the ejection state of ink by the head 20 based on the difference signal. In this way, by not using a beam splitting element, it is possible to reduce the size and cost of the inkjet printer 10 while improving the accuracy of judgement of the ejection state of ink.

Although the high frequency filter 97 is connected to the amplifier 96 in the above description, the high frequency filter 97 may be connected to the internal light receiving element 90. In this case, the high frequency filter 97 passes a component of a predetermined frequency band (for example, a first high frequency component that is a component of a high frequency band of 10 Hz or more) in the internal light receiving signal of the internal light receiving element 90 and outputs to the subtraction circuit 65. The subtraction circuit 65 outputs a difference signal between the first high frequency component and the external light receiving signal to the controller 50, and the controller 50 judges the ejection state of ink by the head 20 based on the difference signal. By not using a beam splitting element, it is possible to reduce the size and cost of the inkjet printer 10 while improving the accuracy of judgement of the ejection state of ink.

In the above mentioned configuration, the first high frequency component of the internal light receiving signal is passed by the high frequency filter 97, however, the first high frequency component of the external light receiving signal may be passed by the high frequency filter 97. In this case, the high frequency filter 97 is connected to the external light receiving element 92 and the subtraction circuit 65, and outputs the first high frequency component of the external light receiving signal to the subtraction circuit 65. The subtraction circuit 65 may obtain a difference between the first high frequency component of the external light receiving signal and the internal light receiving signal as a difference. Further, an amplifier 96 may be provided between the external light receiving element 92 and the high frequency filter 97, and the high frequency filter 97 may output the first high frequency component of the external light receiving signal amplified by the amplifier 96 to the subtraction circuit 65.

<Eleventh Modification>

An inspection section 60F of an inkjet printer 10 according to an eleventh modification, as depicted in FIG. 11, may include a branching filter 48 instead of the high frequency filter 97 of the inspection section 60D (see FIG. 9). The branching filter 48 is provided between the amplifier 96 and the light emission drive circuit 54, and between the amplifier 96 and the subtraction circuit 65, and is connected to them. The branching filter 48 outputs a component of a predetermined frequency band (for example, a low frequency component that is a component of a low frequency band of less than 10 Hz) in the internal light receiving signal amplified by the amplifier 96 with the first amplification degree to the light emission drive circuit 54, and outputs a component of a predetermined frequency band (for example, a first high frequency component that is a component of a high frequency band of 10 Hz or more) to the subtraction circuit 65. In this case, the light emission drive circuit 54 adjusts a drive current of the light emitting element 93 so that the amount of emitted light by the light emitting element 93 is constant based on the low frequency component. Further, the controller 50 judges the ejection state of ink by the head 20 based on the difference signal between the first high frequency component and the external light receiving signal by the subtraction circuit 65.

In this way, since the internal light receiving element 90 which is used to adjust the amount of emitted light of the light emitting element 93 is also used for the judgement of the ejection state of ink, reduction of cost can be achieved. Furthermore, by not using a beam splitting element, it is possible to reduce the size and cost of the inkjet printer 10 while improving the accuracy of judgement of the ejection state of ink. Further, the branching filter 48 may be connected to the internal light receiving element 90, the light emission drive circuit 54 and the subtraction circuit 65.

<Twelfth Modification>

In an inspection section 60E (see FIG. 10) of an inkjet printer 10 according to a twelfth modification, a correction filter 99 that corrects a level of a second high frequency component of the internal light receiving element 90 is included so that the level of the second high frequency component of the light receiving signal of the internal light receiving element 90 matches or approaches a level of the second high frequency component of the light receiving signal of the external light receiving element 92. The subtraction circuit 65 obtains as the difference, a difference between the light receiving signal of the internal light receiving element 90 whose level is corrected by the correction filter 99 and the light receiving signal of the external light receiving element 92.

Specifically, for example, when a low frequency component of the internal light receiving signal of the internal light receiving element 90 is used to adjust the amount of emitted light of the light emitting element 93, the sensitivity of the internal light receiving element 90 of the high frequency band may be lower than the sensitivity of the internal light receiving element 90 of the low frequency band. In this case, the level of the high frequency band of the internal light receiving signal is lower than the level of the high frequency band of the external light receiving signal. For example, while the external light receiving signal of a high frequency band in the range of 10 Hz or more and 100 kHz or less is used to judge the ejection state of ink, the level of the internal light receiving signal is lower than the level of the external light receiving signal in the range of 80 kHz or more and 100 kHz or less. In this case, even if noise is removed from the external light receiving signal by the internal light receiving signal, much noise may remain.

Therefore, as depicted in FIG. 10, a correction filter 99 is provided between the amplifier 96 and the subtraction circuit 65. The correction filter 99 is, for example, an inverse filter, and corrects the level of the internal light receiving signal so that the level of the second high frequency component in a predetermined high frequency band in the internal light receiving signal amplified by the amplifier 96 can match or approach the level of the external light receiving signal. Here, the second high frequency component is, for example, a component of a predetermined high frequency band (for example, 80 Hz or more, preferably 80 kHz or more and 100 kHz or less) whose level is lowered in the internal light receiving signal. Then, the correction filter 99 outputs to the subtraction circuit 65 the internal light receiving signal in which the level of the second high frequency component is corrected. The subtraction circuit 65 outputs to the controller 50 a difference signal between the internal light receiving signal whose level is corrected by the correction filter 99 and the external light receiving signal.

The controller 50 executes a judging operation. In the judging operation, the controller 50 judges the ejection state of ink by the head 20 based on the difference signal. By correcting the level of the second high frequency component of the internal light receiving signal in this way, it is possible to reduce the deterioration in the accuracy of judgement due to the frequency characteristics of the internal light receiving element 90. Furthermore, by not using a beam splitting element, it is possible to reduce the size and cost of the inkjet printer 10 while improving the accuracy of judgement of the ejection state of ink.

In addition, in the above described configuration, the high frequency filter 97 may be provided between the amplifier 96 and the correction filter 99. In this case, the correction filter 99 corrects the second high frequency component of the internal light receiving signal that has passed through the high frequency filter 97 and outputs to the subtraction circuit 65. In this case, the second high frequency component is, for example, a component of a predetermined high frequency band (for example, 80 Hz or more, preferably 80 kHz or more and 100 kHz or less) whose level is lowered, in the component of a predetermined frequency band of the internal light receiving signal that has passed through the high frequency filter 97 (for example, a first high frequency component that is a component of a high frequency band of 10 Hz or more).

Also, the correction filter 99 may be connected to the internal light receiving element 90. In this case, the correction filter 99 corrects the level of the second high frequency component of the internal light receiving signal of the internal light receiving element 90 and outputs to the subtraction circuit 65. Furthermore, the correction filter 99 may be connected to the external light receiving element 92. In this case, the correction filter 99 corrects the level of the second high frequency component of the external/internal light receiving signal of the external light receiving element 92 so that the level of the second high frequency component of the light receiving signal of the internal light receiving element 90 can match or approach the level of the second high frequency component of the light receiving signal of the external light receiving element 92, and outputs to the subtraction circuit 65.

<Thirteenth Modification>

In an inkjet printer 10 according to a thirteenth modification, a first power supply 100 that supplies electric power to the light emitting element 93 and a second power supply 101 different from the first power supply 100, that supplies power to the internal light receiving element 90 are included.

Specifically, as depicted in FIGS. 7 to 10, the first power supply 100 is, for example, a commercial power supply, a battery, or the like, and is connected to the light emitting element 93 without being connected to the internal light receiving element 90, and supplies power to the light emitting element 93. The light emitting element 93 emits light by supplied power from the first power supply 100. Also, the second power source 101 is a power source different from the first power source 100, and is, for example, a battery. The second power supply 101 is connected to the internal light receiving element 90 without being connected to the light emitting element 93 and supplies power to the internal light receiving element 90. The internal light receiving element 90 outputs the internal light receiving signal by supplied power from the second power supply 101 according to the amount of received light. Thus, by separating the first power supply 100 of the light emitting element 93 and the second power supply 101 of the internal light receiving element 90, noise added to the internal light receiving signal from the first power supply 100 can be reduced, and it is possible to improve the accuracy of judgement of the ejection state of ink.

Additionally, the inkjet printer 10 may include a third power supply 102. The third power supply 102 is connected to the external light receiving element 92 without being connected to the light emitting element 93 and supplies power to the external light receiving element 92. The external light receiving element 92 outputs the external light receiving signal by supplied power from the third power supply 102 according to the amount of received light. By separating the first power supply 100 of the light emitting element 93 and the third power supply 102 of the external light receiving element 92 in this manner, noise added to the external light receiving signal from the first power supply 100 can be reduced, and it is possible to improve the accuracy of judgement of the ejection state of ink. Furthermore, by not using a beam splitting element, it is possible to reduce the size and cost of the inkjet printer 10 while improving the accuracy of judgement of the ejection state of ink.

The inkjet printer 10 may also include a fourth power supply 104. The fourth power supply 104 is connected to the amplifier 96 without being connected to the light emitting element 93, and supplies power to the amplifier 96. The amplifier 96 amplifies the internal light receiving signal or the external light receiving signal by supplied power from the fourth power supply 104. Thus, by separating the first power supply 100 of the light emitting element 93 and the fourth power supply 104 of the amplifier 96, noise added to the internal light receiving signal or the external light receiving signal from the first power supply 100 is reduced, and it is possible to improve the accuracy of judgement of the ejection state of ink. When the amplifier 96 amplifies the internal light receiving signal, the second power supply 101 may be used as the fourth power supply 104 and may supply power to the internal light receiving element 90 and the amplifier 96. Also, when the amplifier 96 amplifies the external light receiving signal, the third power supply 102 may be used as the fourth power supply 104 and may supply power to the external light receiving element 92 and the amplifier 96.

<Fourteenth Modification>

In an inkjet printer 10 according to a fourteenth modification, an optical filter 103 that corrects a level of the light receiving signal of the external light receiving element 92 is included so that a rate of change of the sensitivity of the external light receiving element 92 with respect to a wavelength of light, which is a ratio of the light receiving signal of the external light receiving element 92 to the amount of received light of the external light receiving element 92, can match or approach a rate of change of the sensitivity of the internal light receiving element 90 with respect to a wavelength of light, which is a ratio of the light receiving signal of the internal light receiving element 90 to the amount of received light of the internal light receiving element 90.

Specifically, as depicted in FIG. 11, the wavelength of light that the light emitting element 93 emits, changes by the temperature of the light emitting element 93 and the supplied current. The internal light receiving element 90 that receives light of the light emitting element 93 and the external light emitting device 92 change the sensitivity depending on the wavelength of received light. The rate of change of the sensitivity of the internal light receiving element 90 with respect to the wavelength of light that the internal light receiving element 90 receives, and the rate of change of the sensitivity of the external light receiving element 92 with respect to the wavelength of light that the external light receiving element 92 receives may differ from each other. In this case, even if noise is removed from the external light receiving signal by the internal light receiving signal, much noise may remain.

Therefore, an optical filter 103 is provided between the light irradiation device 91 and the external light receiving element 92. The optical filter 103 corrects the level of the external light receiving signal so that the rate of change of the sensitivity of the external light receiving element 92 matches or approaches the rate of change of the sensitivity of the internal light receiving element 90. The optical filter 103 has characteristics of different transmittance depending on the wavelength of incident light, and is, for example, a color filter or the like. The optical filter 103 then outputs the corrected internal light receiving signal to the subtraction circuit 65. The subtraction circuit 65 outputs to the controller 50 a difference signal between the internal light receiving signal and the external light receiving signal whose level is corrected by the optical filter 103.

The controller 50 executes a judging operation. In the judging operation, the controller 50 judges the ejection state of ink by the head 20 based on the difference signal. By correcting the level of the external light receiving signal by the optical filter 103 in this manner, it is possible to reduce the deterioration in the accuracy of judgement caused by the frequency characteristics of the internal light receiving element 90 and the external light receiving element 92. Furthermore, by not using a beam splitting element, it is possible to reduce the size and cost of the inkjet printer 10 while improving the accuracy of judgement of the ejection state of ink.

At least one function of the amplifier 96, the correction filter 99, the high frequency filter 97, and the subtraction circuit 65 may be executed by digital processing of the controller 50.

It should be noted that the above mentioned embodiments and modifications may be combined with each other as long as they do not exclude each other. Also, from the above description many improvements and other embodiments of the present disclosure will be apparent to those skilled in the art. Accordingly, the above description is to be construed as illustrative only and is provided for the purpose of teaching those skilled in the art the best mode of carrying out the present disclosure. The details of the configuration and/or function may be substantially changed without departing from the spirit of the present disclosure.

The inkjet printer of the present disclosure is useful as an inkjet printer or the like that can improve the accuracy of judgement of the ejection state of ink by the head.

What is claimed is:

1. An inkjet printer, comprising:

a head including a nozzle configured to eject an ink;

a light emitting element configured to emit light;

a beam splitter configured to split an optical path, which is a path of light emitted from the light emitting element, into a first optical path and a second optical path;

a first light receiving element configured to receive light passing through the first optical path;

a second light receiving element configured to receive light passing through the second optical path;

a subtraction circuit configured to obtain a difference between an amount of received light by the first light receiving element and an amount of received light by the second light receiving element; and a controller, wherein:

the first optical path is provided so as to pass through a flying area in which the ink ejected from the nozzle flies, the second optical path is provided so as not to pass through the flying area, the controller is configured to execute a judgement of an ejection state of the ink based on the difference, and the controller is configured to control an amount of light emitted from the light emitting element based on an elapsed time from a predetermined time.

2. The inkjet printer according to claim 1, wherein a ratio of an amount of light split by the beam splitter and passing through the first optical path to an amount of light passing through the second optical path is one to one.

3. The inkjet printer according to claim 1, further comprising a carriage configured to move the head between a printing area and a maintenance area, the printing area being an area in which an image is printed by ink ejected from the nozzle, and the maintenance area being an area which is located outside the printing area and in which a receiving section that receives ink ejected from the nozzles is positioned, wherein the flying area is an area between the head located in the maintenance area and the receiving section, and the beam splitter is positioned in the maintenance area.

4. The inkjet printer according to claim 1, wherein the subtraction circuit includes an operational amplifier.

5. The inkjet printer according to claim 1, wherein the subtraction circuit includes one of a transistor and an FET.

6. The inkjet printer according to claim 1, further comprising a guard crossing the first optical path, separating the beam splitter and the flying area, and including a passing portion through which light passing through the first optical path passes.

7. The inkjet printer according to claim 1, wherein the controller is configured to control the light emitting element so as to cause the amount of emitted light from the light emitting element to increase as an accumulated time of printing time for printing an image on a print medium with ink ejected from the nozzle increases.

8. The inkjet printer according to claim 1, wherein the controller is configured to control the light emitting element so as to cause the amount of emitted light from the light emitting element to increase as the number of executions of the judging operation increases.

9. The inkjet printer according to claim 1, further comprising an output section, wherein in a case that the number of executions of the judgement reaches a predetermined number of times, the controller is configured to control the output section to output information regarding cleaning or replacement of the beam splitter.

10. The inkjet printer according to claim 1, further comprising an output section, wherein in a case that at least one of the amount of received light of the first light receiving element and the amount of received light of the second light receiving element becomes less than a predetermined amount of light, the controller is configured to control the output section to output information regarding cleaning or replacement of the beam splitter.

* * * * *